United States Patent
Wiseman et al.

(10) Patent No.: US 9,061,948 B2
(45) Date of Patent: Jun. 23, 2015

(54) HOMOGENEOUS ENRICHED BIOSOLIDS PRODUCT AND PROCESS OF BIO-NUTRIENT GRANULATION FOR MAKING SAME

(71) Applicant: Synagro Technologies, Inc., Houston, TX (US)

(72) Inventors: Terry L. Wiseman, Lakeland, FL (US); Robert E. Lambalot, Jr., Prospect, CT (US); Clyde J. Harris, Palm Harbor, FL (US); Keith D. Cochran, Killen, AL (US); Timothy G. Holt, Florence, AL (US); Gregory S. Peeden, Killen, AL (US)

(*) Notice: Subject to any disclaimer, the term of this patent is extended or adjusted under 35 U.S.C. 154(b) by 0 days.

(21) Appl. No.: 13/942,525

(22) Filed: Jul. 15, 2013

(65) Prior Publication Data
US 2014/0223979 A1    Aug. 14, 2014

Related U.S. Application Data

(60) Provisional application No. 61/673,077, filed on Jul. 18, 2012.

(51) Int. Cl.
| | |
|---|---|
| C05F 7/00 | (2006.01) |
| C05B 7/00 | (2006.01) |
| C05B 17/00 | (2006.01) |
| C05C 3/00 | (2006.01) |
| C05C 9/00 | (2006.01) |
| C05D 9/02 | (2006.01) |
| C05F 11/00 | (2006.01) |

(52) U.S. Cl.
CPC . *C05B 7/00* (2013.01); *C05B 17/00* (2013.01); *C05F 11/00* (2013.01); *C05C 3/00* (2013.01); *C05C 9/00* (2013.01); *C05D 9/02* (2013.01); *C05F 7/00* (2013.01)

(58) Field of Classification Search
USPC ..................................................... 71/11–26
See application file for complete search history.

(56) References Cited

U.S. PATENT DOCUMENTS

| | | |
|---|---|---|
| 3,655,396 A | 4/1972 | Goto et al. |
| 3,939,280 A | 2/1976 | Karnemaat |
| 3,942,970 A | 3/1976 | O'Donnell |
| 4,081,366 A | 3/1978 | O'Donnell |
| 4,304,588 A | 12/1981 | Moore, Jr. |
| 4,519,831 A | 5/1985 | Moore |
| 4,521,452 A | 6/1985 | Highsmith |
| 4,981,936 A | 1/1991 | Good, Jr. |
| 4,988,442 A | 1/1991 | Highsmith |

(Continued)

*Primary Examiner* — Wayne Langel
(74) *Attorney, Agent, or Firm* — Paul E. White, Jr.; Manelli Selter PLLC

(57) ABSTRACT

A nutrient enriched biosolids fertilizer product including dried granules or pellets of a homogeneous mixture of biosolids and nutrients selected from the group consisting of nitrogen, phosphorus and potassium compounds resulting in a NPK assay of 4 to 15 N-1 to 10 P-4 to 15 K, and a process for producing a fertilizer including the following steps: 1) mixing wet sewage sludge cake with nutrients selected from nitrogen, phosphorus and potassium compounds, in a mixer together with recycled dried granules or pellets of biosolids fertilizer product to form a dryer homogeneous mixture; 2) granulating or pelletizing the dryer homogeneous mixture to result in granules or pellets; 3) drying the granules or pellets of homogeneous mixture to result in dried granules or pellets of the biosolids fertilizer product; and 4) recycling a portion of dried granules or pellets of homogeneous mixture to the mixer.

9 Claims, 11 Drawing Sheets

(56) References Cited

U.S. PATENT DOCUMENTS

| | | |
|---|---|---|
| 5,008,319 A | 4/1991 | Highsmith |
| 6,841,515 B2 | 1/2005 | Burnham |
| 6,852,142 B2 | 2/2005 | Varshovi |
| 7,513,927 B2 | 4/2009 | Faulmann |
| 7,662,205 B2 * | 2/2010 | Burnham .......................... 71/11 |
| 8,617,285 B2 | 12/2013 | Culp |
| 2010/0288003 A1 * | 11/2010 | Burnham et al. ................. 71/12 |
| 2012/0234063 A1 * | 9/2012 | Burnham .......................... 71/13 |
| 2014/0137614 A1 * | 5/2014 | Burnham et al. ................... 71/8 |

* cited by examiner

Process Schematic

Cross-Section of Biosolids Product Granule (scanning electron microscope 80x)

Cross-Section of Pinellas Base Pellet (scanning electron microscope 80x)

Moisture Content of Sludge Pellets at Relative Humidity

Heat flow in the Microcalorimeter for Base Pellets

Moisture Sorption/Desorption Isotherm Curve

HOMOGENEOUS ENRICHED BIOSOLIDS PRODUCT AND PROCESS OF BIO-NUTRIENT GRANULATION FOR MAKING SAME

BACKGROUND OF THE INVENTION

1. Field of the Invention

The present invention relates to the production, composition and use of fertilizer granules or pellets in which inorganic nutrients have been thoroughly and exceptionally incorporated into sewage sludge so as to become a homogeneous mix. The composition of mixed sludge and nutrients can be used as an enriched fertilizer product in the form of wet cake after mixing, or after granulation and/or drying. The process of the invention is intended to produce a product in which the inorganic nutrients are virtually indistinguishable from the sludge into which they have been incorporated. The invention includes the incorporation of nitrogen, phosphorus and potassium nutrient compounds and other nutrients into sewage sludge by premixing them with the sludge prior to use or further processing for the purpose of changing the final, physical form of the product by granulation or drying.

The use of products derived from sewage sludge as a fertilizer has been in practice for years. The organic matter in the solids, particularly the organic nitrogen compounds are in a matrix that provides for the slow release of the inherent nutrients into the soil. Previously, fertilizer producers have also been mixing a variety of inorganic nutrient materials to tailor the nitrogen, phosphorus, potassium (NPK) to meet the needs of specific crops or land applications. The challenge for this industry has been the inability to produce a thoroughly mixed, uniform material that will maintain its NPK assays at all stages of production, handling and application. The science of bulk solids flow properties largely expects segregation and separation of materials, when materials of various sizes and densities are mixed together. For fertilizer products, the challenge is compounded by the sheer volume of material that is mixed, transported and applied.

2. Description of Related Art

Older technologies include U.S. Pat. No. 6,841,515 (Jan. 11, 2005) which concerns a fertilizer core particle with one or more concentric layers that are distinguishable from the core with respect to nutrient content, density, hardness, etc. U.S. Pat. No. 7,513,927 (Apr. 7, 2009) relates to a fertilizer product that prevents self heating but is primarily concerned with the in situ formation of ammonium sulfate. The focus of this patent is on "enriched inorganic fertilizer" wherein biosolids are placed into inorganics, in contrast to the present invention wherein inorganics are incorporated into biosolids.

Accordingly, the product of the present invention is homogeneous enriched biosolids fertilizer. The inventors have informally referred to the product as "Bioblend."

BRIEF SUMMARY OF THE INVENTION

The invention thus provides several embodiments including those which encompass an enriched biosolids fertilizer composition and those which encompass a process for making the fertilizer composition. An important feature of the biosolids product composition is its ability to maintain the nutrients in the product matrix without the separation of individual nutrients from the main product mass during handling or use. In contrast to prior attempts to incorporate nutrients into the organic matter of sewage sludge, the present product is a uniform material, thoroughly mixed with selected inorganic nutrients and will maintain its NPK assays at all stages of production, handling and application.

A further embodiment of the present invention is a biosolids product that has been granulated and thus provides a dense, fused structure of the product granules that results in improved crush strength and resistance to abrasion.

The product of the invention has improved bulk storage stability due to the inorganic nutrients having been incorporated into the biosolids product granule/pellet in a manner which denies access of the water to the product surface and to a large percentage of its pore structure. The biosolids product of the present invention is highly resistant to heating by wetting. For biosolid granules/pellets in bulk storage or bulk transport, this is an important feature because the product is subject to numerous wetting and drying cycles over time.

The product enhancements for the present biosolids product include the following:

Improved crush strength compared to the base product without incorporated inert ingredients.
Improved abrasion resistance compared to the base product without incorporated inert ingredients.
Improved homogenous nutrient sludge mix at any stage and in any form throughout the production process.
Improved bulk stability
Improved resistance to moisture gain from humidity in air.
Reduction in separation of nutrients from biosolids after manufacture.
Reduction in potential heat of wetting from moisture gain.
Improved odor profile.

The present invention includes embodiments of a process for making the present biosolids product to effect the incorporation of nutrients in such a fashion as to guarantee the product assay by precluding any separation of nutrients from the main product mass.

The present state of the art indicates that bulk solids flow properties largely expects segregation and separation of materials, when materials of various sizes and densities are mixed together. The present process results in a stable homogeneous mix that precludes separation of nutrients from the sewage sludge.

In one embodiment of the process, inorganic nutrients are added into the sludge cake prior to mixing with recycled dried granule/pellet product, which resulted in a highly homogenous and stable mix.

In another embodiment of the process, the resulting product has highly incorporated nutrients when a nitrogen containing compound or material was first added and mixed prior to the addition of another nutrient such as a potassium compound or material.

The process of the invention makes most of the pore structure of the sewage sludge unavailable to capillary water and thus reduces heat resulting from the heat of wetting phenomenon. Further, the process makes the product much more resistant to any wetting by dramatically slowing the rate at which the product can adsorb and desorb water from the atmosphere.

The process of the invention results in a nutrient enriched biosolids product that is a thoroughly homogeneous mix which has high stability during storage.

Additional aspects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and do not restrict the invention, as claimed.

DETAILED DESCRIPTION OF THE INVENTION

Figure 1:
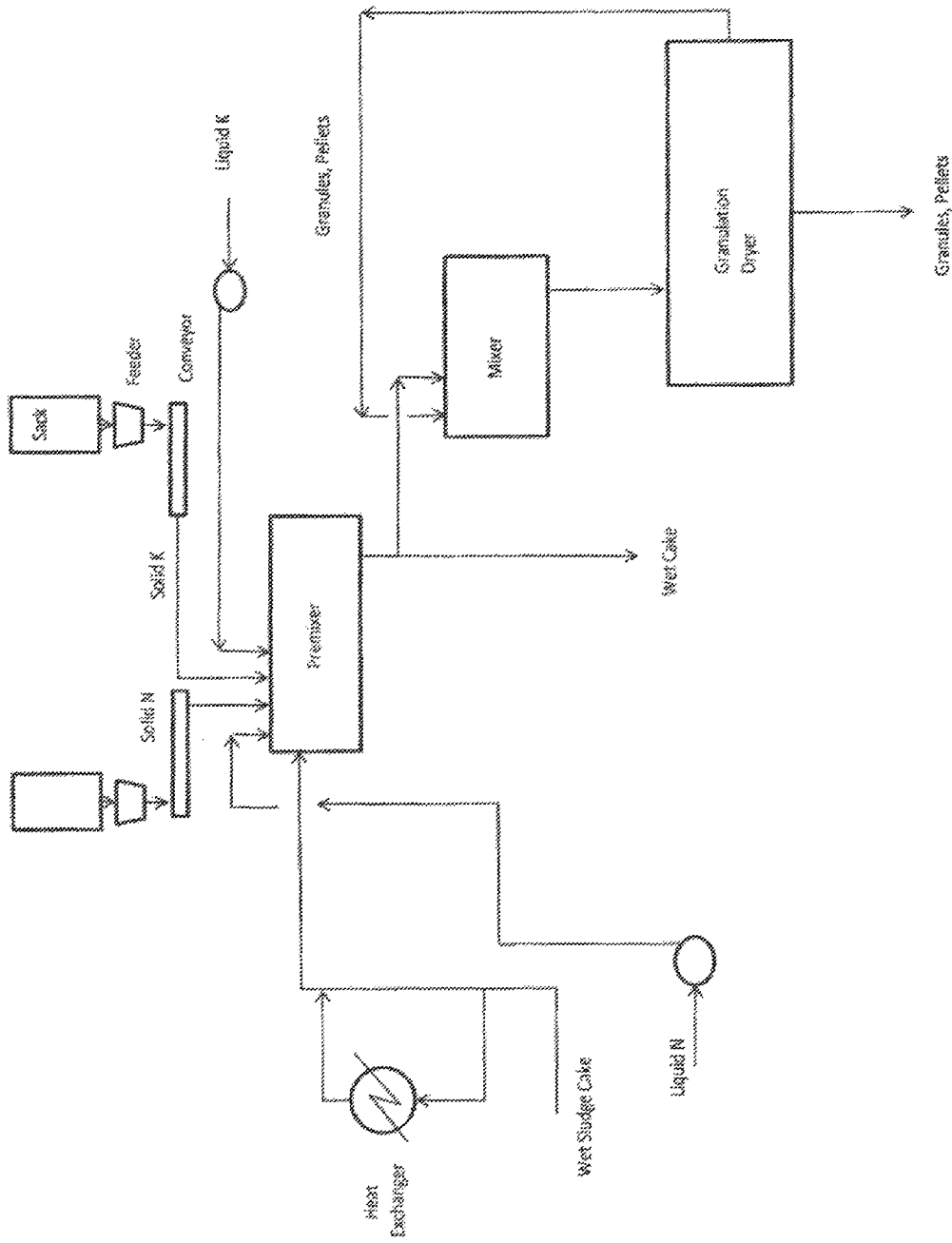
FIG. 1 shows a schematic of the process of the invention.

Embodiments of the present invention include the following:

1) A nutrient enriched biosolids fertilizer product comprising:
dried granules or pellets of a homogeneous mixture of biosolids and plant nutrients selected from the group consisting of nitrogen compounds, phosphorus compounds and potassium compounds resulting in a NPK assay of 4 to 15 N-1 to 10 P-4 to 15 K; and
wherein the granules or pellets have a crush strength of 3.8 to 8.4 lbs.

2) The biosolids fertilizer product of 1, wherein the granules or pellets have an abrasion resistance of 0.3 to 4.5%.

3) The biosolids fertilizer product of 1, wherein the NPK assay is 6 to 12 N-1 to 4 P-6 to 12 K.

4) The biosolids fertilizer product of 1, wherein the NPK assay is 8-2-8 or 10-2-10.

5) The biosolids fertilizer product of 1, wherein the nitrogen compound is selected from the group consisting of urea, ammonium sulfate, ammonium nitrate, calcium nitrate, diammonium phosphate, monoammonium phosphate, potassium nitrate and sodium nitrate;

6) The biosolids fertilizer product of 1, wherein the phosphorous compound is selected from the group consisting of diammonium phosphate, monoammonium phosphate, monopotassium phosphate, dipotassium phosphate, tetrapotassium pyrophosphate, and potassium metaphosphate.

7) The biosolids fertilizer product of 1, wherein the potassium compound is selected from the group consisting of potassium sulfate, potassium chloride, potassium nitrate, monopotassium phosphate, dipotassium phosphate, tetrapotassium pyrophosphate, and potassium metaphosphate.

8) The biosolids fertilizer product of 1, further including micronutrients selected from the group consisting of iron sulfate, iron oxides, chelated iron, zinc sulfate, iron nitrate, zinc oxide, chelated zinc, copper oxide, copper sulfate, copper nitrate, magnesium nitrate, magnesium sulfate, magnesium oxide, selenium sulfate and selenium oxide.

9) The biosolids fertilizer product of 1, wherein the granules or pellets are 1.4 to 3.4 mm in diameter.

10) The biosolids fertilizer product of 1, wherein the granules or pellets have bulk density is 38.6 to 46.9 lbs/ft$^3$.

11) A process for producing a nutrient enriched biosolids fertilizer comprising the following steps:
A) premixing wet sewage sludge cake with liquid or solid plant nutrients selected from the group consisting of nitrogen compounds, phosphorus compounds and potassium compounds, in a first mixer to form a homogeneous mixture;
B) mixing the homogeneous mixture from the first mixer in a second mixer together with recycled dried granules or pellets of biosolids fertilizer product of step E to form a dryer homogeneous mixture;
C) granulating or pelletizing the dryer homogeneous mixture to result in granules or pellets;
D) drying the granules or pellets of homogeneous mixture to result in dried granules or pellets of the biosolids fertilizer product; and
E) recycling a portion of dried granules or pellets of homogeneous mixture to the second mixer.

12) The process of 11 further including the heating of the wet sludge cake to a temperature of 65 to 180° F. prior to mixing with liquid or solid plant nutrients.

13) The process of 11 wherein the first mixer is a pug mill or plow mixer

14) The process of 11 wherein the step of drying the granules or pellets of homogeneous mixture employs a dryer which is a rotary drum drying system or a heated screw drying system.

15) The process of 11 wherein the solids content of the homogeneous mixture in the first mixer is 17 to 35 percent solids.

16) The process of 11 wherein the moisture content of the first mixer is maintained sufficient to solubilize the nutrient compounds.

17) The process of 11 wherein, of the liquid or solid plant nutrients, the nitrogen compound is added to the mixer first.

18) The process of 11 wherein the nitrogen compound is urea and the potassium compound is potassium sulfate, resulting in the granules or pellets of the biosolids fertilizer product having NPK of 13-6-13.

19) The process of 11 wherein the nitrogen compound is ammonium sulfate and the potassium compound is potassium sulfate, resulting in the granules or pellets of biosolids fertilizer product having NPK of 9-6-9.

20) A process for producing a nutrient enriched biosolids fertilizer comprising the following steps:
A) mixing wet sewage sludge cake with liquid or solid plant nutrients selected from the group consisting of nitrogen compounds, phosphorus compounds and potassium compounds, in a mixer together with recycled dried granules or pellets of biosolids fertilizer product of step D to form a dryer homogeneous mixture;
B) granulating or pelletizing the dryer homogeneous mixture to result in granules or pellets;
C) drying the granules or pellets of homogeneous mixture to result in dried granules or pellets of the biosolids fertilizer product; and D) recycling a portion of dried granules or pellets of homogeneous mixture to the mixer.

Product of the Invention

The principal feature of the product is its ability to maintain the nutrients in the product matrix without the separation of individual nutrients from the main product mass during handling or use. The intent of the process, as one embodiment is schematically shown in FIG. 1, is to effect the incorporation of nutrients in such a fashion as to guarantee the product assay by precluding any separation of nutrients from the main product mass.

Further, the incorporation of nutrients into sewage sludge in this manner enhances product storage stability by making most of the pore structure of the sludge unavailable to capillary water and the heat of wetting represented by the surface chemistry associated with that phenomenon. Additionally, this makes the product much more resistant to any wetting by dramatically slowing the rate at which the product can adsorb and desorb water from the atmosphere.

The homogeneous, enriched biosolids product of the present invention results from processing the sludge to become Class A "biosolids" which meets the U.S. Environmental Protection Agency (EPA) pollutant and pathogen requirements for and application and surface disposal. To ensure that biosolids applied to the land do not threaten public health, the U.S. Environmental Protection Agency (EPA) created the 40 CFR Part 503 Rule. It categorizes biosolids as Class A or B, depending on the level of pathogenic organisms in the material, and describes specific processes to reduce pathogens to these levels.

Class A biosolids contain minute levels of pathogens. To achieve Class A certification, biosolids must undergo heating, composting, digestion or increased pH that reduces pathogens to below detectable levels. Some treatment processes change the composition of the biosolids to a pellet or granular substance, which can be used as a commercial fertilizer. Once these goals are achieved, Class A biosolids can be land applied without any pathogen-related restrictions at the site. Class A biosolids can be bagged and marketed to the public for application to lawns and gardens.

For the purposes of the present invention "sewage sludge" and "biosolids" are defined as follows:

"Sewage sludge" (per 40 CFR Part 503) is a solid, semi-solid, or liquid residue generated during the treatment of domestic sewage in a treatment works. Sewage sludge includes scum or solids removed in primary, secondary, or advanced wastewater treatment processes and any material derived from sewage sludge (e.g., a blended sewage sludge/fertilizer product) but does not include grit and screenings or ash generated by the firing of sewage sludge in an incinerator.

"Biosolids" refers to sewage sludge that has been generated with treatment to meet the EPA pollutant and pathogen requirements for and application and surface disposal. When treated and processed, sewage sludge becomes biosolids containing nutrient rich organic materials which can be safely recycled and applied as fertilizer to sustainably improve and maintain productive soils and stimulate plant growth.

Based upon the test results described in the Examples of this application, the product enhancements include the following:

Improved crush strength compared to the base product without incorporated inert ingredients.
Improved abrasion resistance compared to the base product without incorporated inert ingredients.
Improved homogenous nutrient sludge mix at any stage and in any form throughout the production process.
Improved bulk stability
Improved resistance to moisture gain from humidity in air.
Reduction in separation of nutrients from biosolids after manufacture.
Reduction in potential heat of wetting from moisture gain.
Improved odor profile.

Nutrient separation is typically observed visually or tested to determine whether NPK values remain at their original levels. Potassium and phosphate nutrients are less soluble than the nitrogen bearing compounds and can normally be seen in their original white or off-white small particle size as separated from the grey to black biosolid sludge or pellet base. During the pilot trials described in Example 1, the nutrients were never seen as separated from the product at any stage in its processing.

Figure 2:
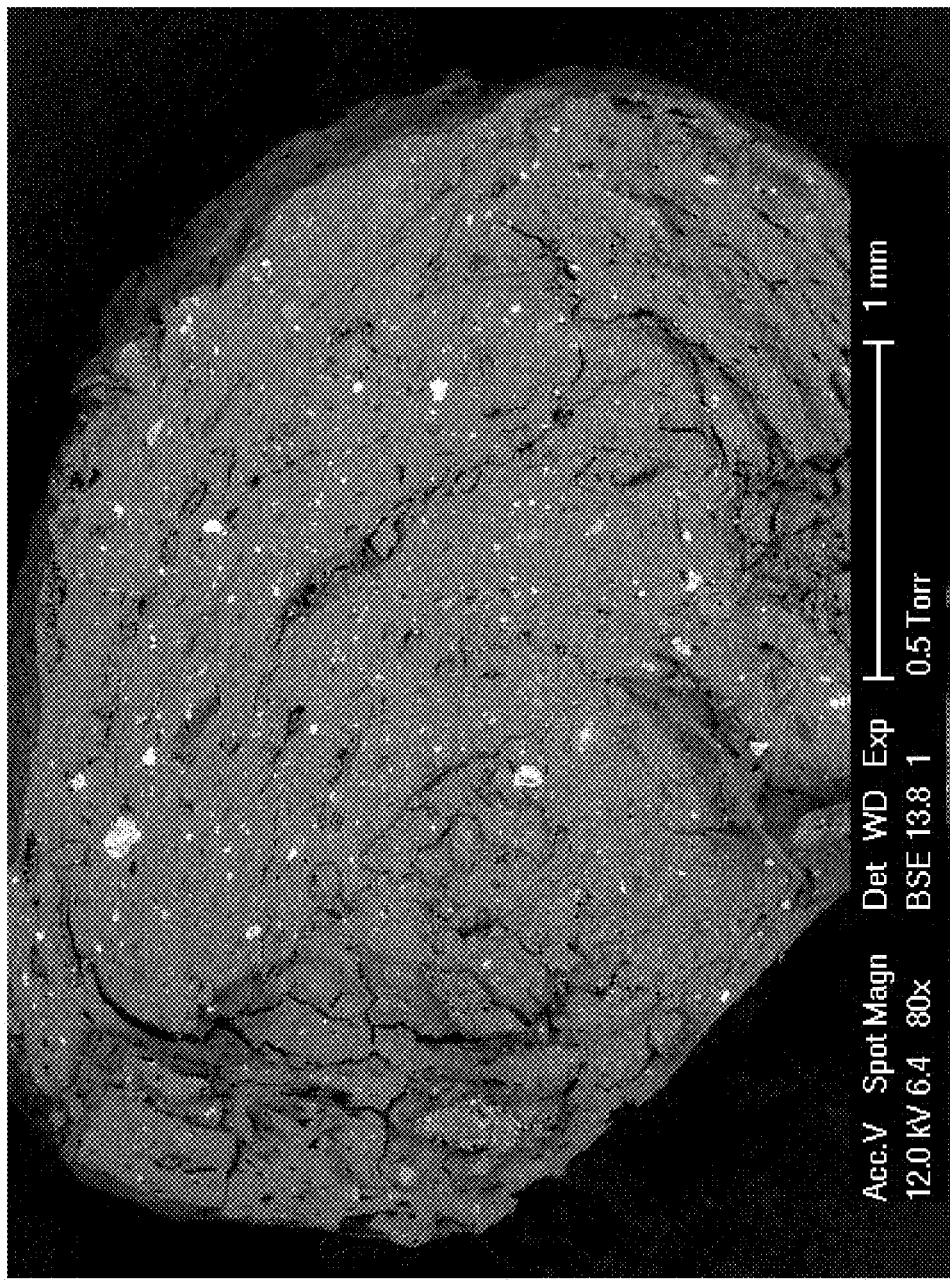
FIG. 2 shows a cross-section of the biosolids product granule of the invention.
Figure 3:
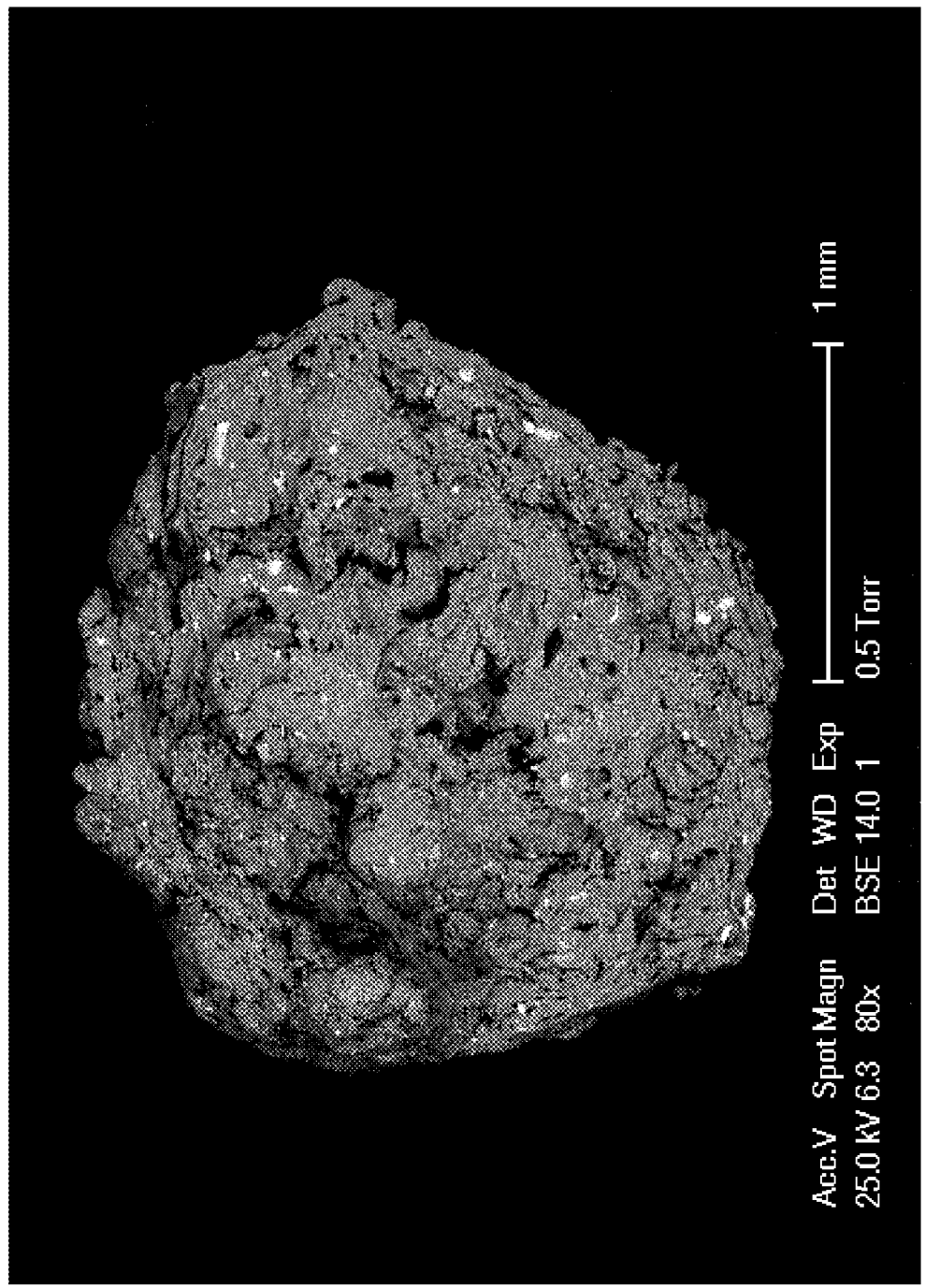
FIG. 3 shows a cross-section of a sewage sludge pellet from the Pinellas sewage treatment plant and serves as a baseline for comparison.

The dense, solid, fused granulated or pelletized particles of the present biosolids product can be seen in the scanning electron microscope (SEM) picture of a product granule in cross-section, as shown in FIG. 2. In comparison, the SEM cross-section of a corresponding base biosolids pellet (i.e. comparison baseline—see Example 1) displays a more cavity interspersed, less compact and less solidly fused character, as shown in FIG. 3. The dense, fused structure of the product granules or pellets of the present invention results in improved crush strength and resistance to abrasion. From Example 1, the crush strength ranges from 3.8 to 8.4 lbs. The abrasion resistance (percent degradation) ranges from 0.3 to 4.5%. From Example 1, the size of the granules/pellets of the product of the present invention ranges from 1.4 to 3.4 mm in diameter. The bulk density ranges from 38.6 to 46.9 lbs/ft$^3$ with the more typical value being 46.2 lbs/ft$^3$.

Product storage stability is usually concerned with the potential of biomass to self heat. This phenomenon is common to coal, forest products, grains, textiles and most other hydrocarbon based materials. For a biomass such as sewage sludge, there are a number of mechanisms involved with the product's need to come to equilibrium with the oxygen in the air after processing and with the moisture in the air after transport from the process. Biosolids product heating that begins during the process stages typically involve autoxidation and redox (oxidation-reduction) reactions. All biomass contains hydrogen unsaturated compounds which are susceptible to slow oxidation at the double bonds. This process proceeds with atmospheric oxygen or with the oxygen present in the hydrocarbons and the free radicals which evolve over time. Raw sludge self heats through biological activity up to 176° F. Thermally dried sludge and raw sludge at temperatures above 176° F. will experience autoxidation and other minor chemical reactions.

Bulk storage stability is principally a matter of material wetting if all other oxygen equilibrium issues are reduced to the slow autoxidation processes. Carbon based materials with pore structures such as wood, wool and biomass (including sewage sludge) will experience heating when wetted. This phenomenon is due to the surface chemistry of water as it adheres to a surface or fills pores. The amount of water retained by these materials at any time is dependent on the partial pressure of water vapor in the air surrounding them. This correlates to relative humidity and temperature of the air. Sorption/desorption testing was performed on the biosolids product of the invention having NPK 8-2-8 to determine its weight gain/loss when exposed to changes in humidity (see Example 4 of this application). The test is performed in a closed system with the sample sitting on a microbalance in the chamber.

System humidity is changed in 5% increments with a microprocessor initiating the next change after the balance achieves constant weight. The results of Example 4A and Example 4C shows that the present biosolids product can adsorb water vapor up to a fractional concentration of 30 parts of water/100 parts of dry solids at 95% relative humidity (RH). The product can also desorb water with decreasing relative humidity.

The heat of wetting occurs as water vapor condenses on the product surface and as it condenses on each successive layer of water. The magnitude of the wetting is determined by isothermal or micro-stirred reaction calorimetry. For the test, predried product is injected with water up to a point of saturation. At constant temperature, the apparatus measures the energy flowing out of the system (see Example 4B). The differential or rate of heating is highest when the product surfaces are fully available to the injected water. Heating continues at slower rates as more water becomes involved with the available wetted surfaces. The initial rate of heating for the base pellet was 516.4 BTU/hr/lb of water added compared to 38.2 BTU/hr/lb of water added for the 8-2-8 product. The microprocessor integrates the energy flow over the course of the test and determines the integral or total heating for the test. The biosolids product of the present invention released 3.16 BTU/lb. of water added compared to 53.17 BTU/lb. of water added for the base line (control) material. This demonstrates that the inorganic nutrients have been incorporated into the biosolids product granule/pellet in a manner which denies access of the water to the product surface and to a large percentage of its pore structure.

For finished product in a bulk pile, the heat of wetting is a function of the level of energy release and the time it takes for a material to adsorb and desorb water. The background data (see Example 4) for the sorption curve showed that the biosolids product took 104.5 hours to gain water weight from 5% RH to 95% RH. A similar biomass from New York Organic Fertilizer Company (NYOFCo), tested in Example 4A, took 10.5 hours to complete that weigh gain. The combined tests showed the present biosolids product to release less energy by a factor of 23 and take 10 times more hours to do so. This demonstrates that the biosolids product of the present invention is highly resistant to heating by wetting.

For biosolid granules or pellets in bulk storage or bulk transport, this is an important feature because the product is subject to numerous wetting and drying cycles over time. Even though water can be desorbed, the heating effects of the wetting stage stay with the material. In general, when heating (no matter how small), takes place in a biosolids granule/pellet, it causes low volatility materials (e.g., water, cyclic compounds, etc.) to move away from the place of heating. The heating changes the physical nature of the granule/pellet and soon changes the chemical nature as well. Even if the heating source is removed, these changes are essentially irreversible and stay with the product granule/pellet, making the granule pellet more unstable than it was. This occurrence is common to all biosolids, but is reduced for the biosolids product of the present invention.

All biosolids are susceptible to autoxidation attack on the points of unsaturation in the hydrocarbon portion of the product. The biosolids product of the present invention includes higher values of NPK with lower organic content, thus lessening the effect of autoxidation on any potential for the product to self-heat by this route. The bulk wetting testing also suggests that the surface of the pores are as unavailable to oxygen as they are to water vapor. Historically, the test method used for the heat of wetting was used to determine the area of pore surface in a material. The low heating result for the present biosolids product shown in Example 4 coincides with decreased available area.

The lack of separation of nutrients within the homogeneous, enriched biosolids product of the present invention is evidenced by the results of Example 2. The summary tables of data include mix (composition embodiments of the present product) and calculated NPK values that do not show any separation of nutrients.

In the pilot trials described in Example 1, there was an internal assay inventory in the pilot plant at all times represented by the dryer contents and the volume of material in the recycle bin (see FIG. 1 process schematic). NPK analysis is tested from the finished product screen and also product from the recycle bin including at steady state and on startup and shutdown. No separation of nutrient inorganics from the present biosolids product were observed over time even though there were variations in the process.

For the present biosolids product, the NPK ranges from 4-1-4 to 15-10-15, i.e., (4 to 15 N)-(1 to 10 P)-(4 to 15 K). The NPK is preferably 6 to 12 N-1 to 4 P-6 to 12 K and most preferably 8 to 10 N-2 P-8 to 10 K. This would include compositions of NPK being 13-6-13 using, for example, urea as the mixed inorganic nitrogen nutrient and potassium sulfate as the potassium nutrient. This would further include compositions of NPK being 9-6-9 using, for example, ammonium sulfate as the mixed nitrogen nutrient and potassium sulfate as the potassium nutrient. Additionally, the examples show good evidence of dense granules of the present biosolids product having NPK analysis of 8-2-8 and 10-2-10 with no separation of inorganic nitrogen, phosphorus or potassium nutrients from the biosolids mass.

The present biosolids product has been found to alter the odor characteristics of biosolids and is an improvement in the odor profile. Example 5 and Table 25, show that the volatile fatty acids and aldehydes (contributors to malodors) from the biosolids product of the present invention were much less (about 285% less) than the volatile fatty acids and aldehydes from the corresponding base biosolids pellets (see Example 1). One or more odor adsorbents may be added to the present biosolids product to reduce odor, including odor adsorbent materials that are natural adsorbents such as zeolites and synthetic adsorbents such as ion exchange resins.

Process of the Invention

With respect to the present process, as one embodiment is schematically shown in FIG. 1, it was discovered that the addition of inorganic nutrients into dewatered (25% solids) sludge cake can thoroughly incorporate the nutrients into the sludge matrix. Historically, sludge cake has been converted to dry granules or pellets by applying it to undersized dried granule or pellet product in a high intensity mixer. Initial laboratory mix compositions, as described in Example 2, first focused on mixing the nutrients with dried product prior to coating with sludge cake. There were various problems with the subsequent mixes including a failure to bind the nutrients and a failure to render the mix into a form that could be further processed, if desired. By adding the nutrients into the sludge cake prior to mixing with dried granule/pellet product, various levels of mix improvement were observed.

Finally, the mixes were found to have highly incorporated nutrients when the nitrogen containing material was first added and mixed prior to the addition of the potassium material. The pilot trial product compositions (see Example 1) were placed in trays and dried in convection ovens with samples tested for physical properties. A number of the mixes were found to have little to no physical separation of nutrients from the main mass. A few of the mixes also used sludge cake that was prewarmed. The rheology of sludge cake changes dramatically as its temperature rises, appearing to further improve the incorporation of the nutrients. The sludge cake need only be warmed.

During the lab scale (bench) mixing trials described in Example 2, the recycled pellets were warmed to mimic their condition in most pelletizing plant operations. These temperatures are typically between 130° F. and 170° F. once the recycle bin is refilled with new process material. The main focus of the heat gun in the bench trials was to determine if the homogeneous nature of the mix would stay intact while the batch was rolling and undergoing thermal drying. Since the laboratory was able to successfully make NPK 10-2-10 mixes, it is important to make sure that the premix contains enough water to make the nutrients initially soluble in the mix if higher NPK values are desired. One means of accomplishing that end is to warm the incoming wet cake to achieve higher nutrient solubilities based on temperature. Warming the sludge also improves its rheology, enhancing the nutrient mixing process. Wet sludge cake temperatures from 65° F. to 140° F. are preferred. A maximum temperature is about 180° F.

It was observed that wet cake/nutrient premixes involving urea as the nitrogen source, were easier to form, even with cold or room temperature sludge cake. The organic portion of sewage sludge contains a large quantity of lipids which become more hydrophilic under the denaturant activity of urea.

This phenomenon was especially pronounced in pilot trials of the new product described in Example 1.

Thus, the present process (see FIG. 1) forms homogeneous mixtures of sewage sludge cake and inorganic nutrients under conditions in Example 1 including the following:

Urea, in any form, is mixed with the sludge cake and any other nutrient.

Ammonium Sulfate, in any form, is mixed with the sludge cake and in any other unit operation.

The sludge cake can vary in temperature from 65 to 180° F.

The sludge cake is any solid/semi-solid dewatered from thickened sewage treatment plant sludge.

The sludge cake is any primary sludge solid from a sewage treatment plant.

The sludge cake is comprised of primary and/or secondary sludge sourced from an aerobic digestion system or a combination of aerobic or anaerobic digestion.

Nutrient sources added to wet sludge cake during the present process include the following macronutrient compounds:

1) nitrogen compounds selected from the group consisting of urea, ammonium sulfate, ammonium nitrate, calcium nitrate, diammonium phosphate, monoammonium phosphate, potassium nitrate and sodium nitrate;

2) phosphorous compounds selected from the group consisting of diammonium phosphate, monoammonium phosphate, monopotassium phosphate, dipotassium phosphate, tetrapotassium pyrophosphate, and potassium metaphosphate.

3) potassium compounds selected from the group consisting of potassium sulfate, potassium chloride, potassium nitrate, monopotassium phosphate, dipotassium phosphate, tetrapotassium pyrophosphate, and potassium metaphosphate.

Micronutrient sources include iron sulfate, iron oxides, chelated iron, zinc sulfate, iron nitrate, zinc oxide, chelated zinc, copper oxide, copper sulfate, copper nitrate, magnesium nitrate, magnesium sulfate, magnesium oxide, selenium sulfate and selenium oxide.

The process of the invention and resulting homogeneous, enriched biosolids product is largely affected by the nature of the inorganic materials being added to sewage sludge wet cake and the manner and order in which they are combined. The process schematic of FIG. 1 shows a "Premixer" in which the nutrients are added to the sludge wet cake prior to the introduction of that mass into the wet cake/dried solids "Mixer" that prepares the material for introduction into a granulation or drying system ("Granulation/Dryer"). Recycle of "Granules, Pellets" from the Granulation/Dryer to the Mixer enables important control over the water and solids content and homogeneous consistency of the mixed output to the Granulation/Dryer and ultimately, the biosolids product Granules/Pellets. Granulation can be performed by pugmill, drum, rotating pan, fluid-bed, or similar standard granulation equipment or combination of standard granulation equipment. Before being stored as product, the granulated solids are optionally milled, screened, further cooled and dried, but not necessarily in that order, before sending the product to storage. Pelletization can be performed by pelleting press, mold, extrusion or similar standard pelletization equipment or combination of standard pelletization equipment.

The "Wet Sludge Cake" is a starting material which is dewatered sewage sludge from a waste water treatment plant. Dewatering may be performed, for example, by centrifuges, filter belt presses and filter plate/membrane presses. The Wet Sludge Cake is warmed by ambient conditions or by other heating means such as the shown "Heat Exchanger."

The Premixer can be a pug mill, plow mixer or any mixing device used in the industry to thoroughly mix these materials. The Premixer mixes the Wet Sludge Cake and nutrients of nitrogen (N) and potassium (K), shown in FIG. 1 as "Liquid N," "Solid N," "Liquid K" and "Solid K." The solid and liquid forms of the nutrients can be in any combination of liquid nutrients and solid nutrients. Further, other macronutrients and micronutrients can be added in liquid and/or solid forms as shown in the process of FIG. 1 for nitrogen and potassium.

The Premixer is not necessary to the process and the necessary mixing can also be effected in the main Mixer alone. For product quality purposes, the Premixer mixes the Wet Sludge Cake and nutrients separate from the main Mixer to absolutely assure that the NPK assay of the nutrients into the Wet Sludge Cake is completely homogeneous. The use of the Premixer is a preferred embodiment of the process of the invention, resulting in a more homogeneous biosolids product. The Premixer provides assured mixing and the time for mixing depends upon the magnitude and properties (e.g. temperature and solids content) of the input streams, and size and operation of the Premixer to optimize homogeneity of the resulting nutrient enriched, biosolids product.

The addition of the nutrients into the Wet Sludge Cake prior to mixing with dried Granules/Pellets product enabled substantially improved homogeneity of the mixture.

For the bench tests described in Example 2, a range of 5-15 minutes was identified as the time for complete mixing and should be considered as the minimum time of mixing for the present process. The end point was the visual observation of a thorough, homogeneous mix. For the pilot trials described in Example 1, the residence time was a little over an hour (1.0-1.25 Hr.), due to the large size of the Premixer itself. An important feature is that the nutrients have a zone of contact time alone with the Wet Cake before comingling with the recycle Granules/Pellets. In addition to the nutrients themselves, a successfully homogeneous mix is driven by both time and temperature. By adjusting conditions of nutrient solubility in the Wet Sludge Cake, e.g., temperature and available water, nutrient solubilities enable the process to make NPK 8-2-8 biosolids product with virtually any nutrient combination at room temperature.

The process of the present invention is capable of producing nutrient enriched biosolids product wherein the NPK is 4 to 15 N-1 to 10 P-4 to 15 K, preferably 6 to 12 N-1 to 4 P-6 to 12 K and most preferably 8 to 10 N-2 P-8 to 10 K. This would include compositions of NPK being 13-6-13 using, for example, urea as the mixed inorganic nitrogen nutrient and potassium sulfate as the potassium nutrient. This would further include compositions of NPK being 9-6-9 using, for example, ammonium sulfate as the mixed nitrogen nutrient and potassium sulfate as the potassium nutrient.

Wet Sludge Cake is sewage sludge that typically has been mechanically dewatered to about 25% dry solids. The Wet Sludge Cake employed in the pilot trials described in Example 1 resulted from sewage sludge that was difficult to dewater and has 20.5% dry solids. Wet sludge cake (dewatered sewage sludge) can flow as a semi-solid at a percent solids as low as 17%. Normal mechanical dewatering rarely produces sludge cake above 35% dry solids. This is normally dependent on location and available processes. For example, New York City dewaters by centrifuges to a near constant 26%-27% dry solids. Pinellas County, Florida typically dewaters to 20.5% solids which was employed in the pilot trials described in Example 1. For the present process, the Wet Sludge Cake is 17-35% solids and preferably 20-28% solids.

From the bench tests described in Example 2, to produce the homogeneous, nutrient enriched biosolids product of the present invention there must be enough water in the contents of the Premixer to solubilize the added nutrient compounds. This leads to operationally "controlling" the moisture/nutrient levels in the Premixer by adjusting the amount of dry recycled product added to the Premixer. See Example 3 and the associated figures and tables of test results describing the minimum amount of water that should be available at various temperatures to produce a homogeneous mix of nutrients and Wet Sludge Cake. The "proper" premix temperature is affected by the solubility of the nutrient compound, especially for the combined $AmSO_4$—$K_2SO_4$ mixture since both nutrients need water. This combination would be the most water intensive as viewed by the solubilities of the other principal inorganic nutrients shown in the Example 3 figures.

The order of mixing nutrients into the Wet Sludge Cake (for example, nitrogen containing compounds first) is not critical so long as the amount of water required for solubilizing all inorganic nutrients is available. This is generally true for the nitrogen bearing compounds except for urea. Urea is additionally similar to water as a dipole which gives urea the added property of being able to attract (and "unbend") the long chain fatty acids in the Wet Sludge Cake making them and the sludge cake more water soluble. This causes urea to behave as a viscosity modifier which is a bonus attribute for urea. However, water content sufficient to solubilize all of the nutrients is important. The solids content of the premix is preferably 20 to 28 percent solids.

Wet sludge cake can be introduced into the Premixer by screw conveyor or positive displacement pump. It can be introduced at room temperature or prewarmed by passing it through a spiral heat exchanger or other heat transfer device appropriate to a viscous material. The heating source would ideally be hot recycled water from a downstream process if the Premixer output goes on to the Mixer and then granulated or dried to granules or pellets. As shown in FIG. 1, the "Wet Cake" output from the Premixer is a nutrient enriched, homogeneous product. The Premixer mixes or kneads the Wet Sludge Cake, constantly exposing cake surface. The inorganic nutrients, e.g., nitrogen and potassium compounds, can be added as liquid solutions, suspensions or as dry material. Nutrients can be added in any form in any combination and would only be limited by the minimum amount of water needed to solubilize the nutrients and the maximum amount of water the dryer could evaporate in an hour.

Nutrients in liquid solution form can be conveniently pumped and metered to the Premixer from day tanks or bulk storage. Nutrients in bulk solid form can be fed to the Premixer using metered screw feeders ("Feeder" and "Conveyor" in FIG. 1). The nutrient solid material can be loaded to a feed hopper from bulk bags ("Sack" in FIG. 1) or a day hopper into which the material can be transferred from bulk storage. The Premixer should be sized to provide at least a few minutes of mixing time, or sufficient time to assure a homogeneous mix. For the purpose of the pilot trials described in Example 1, the inorganic nutrient feed systems and Premixer were interlocked with the main dryer safety system to prevent overfeeding in the event of a problem downstream.

The Mixer shown in FIG. 1 is a standard high intensity mixer used to comingle nutrient enriched, homogenous Wet Cake and the dried biosolids granule or pellet product of the present invention. Rotary drum drying systems or a heated screw drying system in the present process require that the Wet Cake from the Premixer be mixed at a preferable, approximately one pound of cake for every two pounds of dried product returning by recycle to the Mixer. Thus, rotary dryers have approximately 0.5 to 1.5 parts (preferably one part) wet feed to 1.5 to 2.5 parts (preferably two) parts dry feed with the preferable two parts dry feed essentially the volume of the recycle back to the front. This is to effect the coating of the Wet Cake onto the granules or pellets and to feed the dryer system at a solids content of 55-80% (preferably 65-73%) to avoid the high viscosity paste that the mix can become between 35% and 60% solids. For the purpose of the pilot trials described in Example 1, the Mixer was operated with same operating parameters used in the formation of baseline NPK 5-3-0 pellets which is the typical NPK of pelleted biosolids having no added nutrients.

The present invention is demonstrated with reference to the following examples, which are of an illustrative nature only and which are to be construed as non-limiting.

EXAMPLES

Example 1

Pilot Plant Process and Product: Pinellas County Florida

Pilot trials were performed in January and February 2012 for the purpose of producing 600 tons of the present biosolids product having an analysis of NPK 8-2-8. The product was produced for anticipated storage testing and field evaluations. A schematic of the pilot process is shown in FIG. 1. The pilot testing was conducted at the Pinellas County South Cross Bayou W. Water Reclamation Plant, St. Petersburg, Florida. Sludge resulting from the wastewater treatment is normally treated by Anaerobic Digestion, Thickening, Dewatering, drying and pelletizing, with the pellets having a NPK analysis of 5-3-0 (no nutrients added).

In January 2012, and with reference to FIG. 1, the premixer comprised a pugmill, namely a Howe twin shaft paddle mixer (made by S. Howes Co., Inc., Silver Creek, N.Y., USA) that was installed at the Pinellas County plant along with a sludge line rerouted to feed the premixer unit and then discharge it to the existing WAM plow mixer (made by WAM, Inc., Fort Worth, Tex., USA). The pugmill premixer was designed to handle up to 25 dry tons of material per hour. A bag unloader, hopper and volumetric feeder (a metering feed screw wherein the screw speed was controlled by a variable frequency drive) were sited to feed granular potassium sulfate (as a source of the nutrient, potassium) to the premixer. A day tank and pumping system were installed to add urea solution (as a source of the nutrient, nitrogen) to the inlet of a wet sludge cake pump leading to the premixer. A 50% solution of urea (23% N) was added to the sludge cake pump at the inlet of the positive displacement pump. The rate of chemical addition was controlled by a magnetic gear pump operated by a variable frequency drive. It was evident that the sludge viscosity had been dramatically changed to a more fluid state by the use of the urea. It is believed that this result is related to urea's ability to denature lipids and reduce their surface tension. A large portion of the organic matter in sludge is made up of proteins and fatty acids. As a denaturant, the urea reduces the hydrophobic capacity of the organic molecules. This phenomenon greatly facilitated the incorporation of the potassium sulfate in the cake to produce a wet cake mix in which the potassium sulfate could not be visually distinguished.

Both the potassium sulfate volumetric feeder and urea feed pump were calibrated to continuously deliver known quantities of nutrients. The plant's sludge cake pump was calibrated for volumetric flow of sludge cake to the process. The pilot trial feed rate was 1.25 Dry Tons (DT)/day of sludge cake and nutrients.

The sludge used at the time of the pilot trial has a typical NPK value of 5-3-0. After treatment the resulting base pellets (no nutrients added) had a typical NPK analysis of 6-5-0.6.

The premix system produced homogeneous cake (biosolids, potassium sulfate and urea) out of the premixer and a good cake/recycled pellet (granule) mix out of the plow mixer to the dryer. An Andritz DDS 40™ triple pass rotary dryer (made by Andritz AG, Vienna, Austria) was employed, having an evaporation capacity of 8,800 pounds of water per hour. This heats the solids to approximately 200° F., which drives off moisture and kills pathogens. The heat drying process produces pellets that are >90% solids and are considered Class A Biosolids.

The premix was fed continuously to the main sludge/pellet mixer where the cake was added to recycle pellets to grow the pellets. After 8 hours of processing, the plant's recycle system had turned the base pellets from an NPK of 6-5-0.6 to an assay of 8-2-8 for the nutrient enriched biosolids product of the present invention.

To produce the biosolids product of the present invention with best properties, the fertilizer nutrients of nitrogen and potassium are added directly to the wet cake. The nutrients dissolve into the wet cake and forms a uniform wet cake/nutrient mixture without adding any additional water. The mixture is less viscous then the wet cake alone. The mixture can then be fed directly to the exiting plow mixer and granulated with recycle.

After start up, the plant took eight hours for the continuous recycle to change from 5-3-0 (base pellet NPK) to 8-2-8 biosolids product of the present invention. The biosolids product was produced at a throughput of 30 dry tons per day. See the following Table 1, labeled "Comparison of Present Biosolids Product to Control Base Pellet." Further, see the following Table 2, labeled "Crush Strength and Abrasion Resistance of Present Biosolids Product Compared to Control Base Pellet—January 2012."

TABLE 1

Comparison of Present Biosolids Product to Control Base Pellet
Comparison of Bioblend to Base Pellet

| | | Base Pellet | Bioblend 8-2-0 |
|---|---|---|---|
| Bulk density (apparent) | | 42.5 | 46.2 |
| Nitrogen, Total N | 6.60 as TKN | 6.05 | 8.52 |
| Phosphate, Available P2O5 | 3.30 as P | 5.78 | 4.67 |
| Potassium, Water Soluble K2 | 0.31 as K | 1.53 | 8.70 |
| Nitrogen, Ammonia N | | 0.86 | 0.90 |
| Nitrogen, Nitrite N | | 0.01 | 0.03 |
| Nitrogen, Water Insoluble N | | 5.17 | 4.13 |
| Nitrogen, other Water Soluble N | | 0.10 | 0.92 |
| Nitrogen, Urea N | | 0.42 | 3.17 |
| Crush Strength, lbs | | 2.67 | 6.53 |
| Abrasion Resistance, % degradation | | 6.03 | 0.47 |

TABLE 2

Crush Strength and Abrasion Resistance of Present Biosolids Product Compared to Control Base Pellet - January 2012
Pinellas Pilot Trial - January 2012

| Sample No. | N | P | K | Crush Strength, lbs | Abrasion, % |
|---|---|---|---|---|---|
| Bioblend 8-2-8 | | | | | |
| 1003 | 8.21 | 4.78 | 8.37 | 3.8 | 0.3 |
| 1004 | 8.53 | 4.77 | 8.35 | 5.5 | 0.4 |
| 1005 | 8.62 | 4.77 | 8.35 | 6.5 | 0.4 |
| 1006 | 8.02 | 4.68 | 8.02 | 6.1 | 0.7 |
| 1007 | 8.58 | 4.77 | 9.09 | 6.1 | 0.4 |
| 1008 | 8.97 | 4.56 | 9.00 | 7.4 | 0.3 |
| 1009 | 9.09 | 4.76 | 8.52 | 8.4 | 1.4 |
| 1010 | 8.90 | 4.86 | 8.72 | 4.9 | 4.5 |
| 1011 | 8.62 | 4.80 | 9.28 | 6.2 | 1.6 |
| Base Pellets | | | | | |
| 1019 | 6.06 | 6.19 | 1.77 | 3.0 | 4.7 |
| 1020 | 5.98 | 5.92 | 1.50 | 2.7 | 6.0 |
| 1021 | 6.11 | 6.13 | 1.31 | 2.3 | 7.4 |

Physical and chemical properties of the resulting 8-2-8 biosolids product from the January trial are shown in following Table 3, labeled Test Results for the Pilot Trials Conducted in January 2012.

The pilot trial, employing the same process used in January, was resumed in February, 2012. This second trial confirmed the ability of the process to make stable mixes for presentation to the dryer and showed that there was no separation of nutrients anywhere in the dryer system. Physical and chemical properties of the resulting 8-2-8 biosolids product from the February trial are shown in following Table 4, labeled Test Results for the Pilot Trials Conducted in February 2012.

Thus, the biosolids product of the present invention is a stable mix with no separation of nutrients and accordingly maintaining a reliable NPK analysis of 8-2-8.

For the product resulting from both the January and February 2012 pilot trials, during the time that the 8-2-8 product was stored in plant silos, there were no incidences of temperature elevation during storage.

The biosolids product of the present invention was visually observed and NPK values tested every 4 to 6 hours to confirm that the process achieved and then held the 8-2-8 assay. Both trials lasted two to three days each.

TABLE 3

Test Results for Pilot Trials Conducted in January 2012
Thornton NPK Data for Bioblend 8-2-8 January 2012

| | Historical Chemical Base Pellet | Jan. 11, 2012 2:00 PM Base Pellet | Jan. 17, 2012 10:32 AM 1001 Start Up nutrient start 9:00 am | Jan. 17, 2012 2:45 PM 1002 | Jan. 17, 2012 6:30 PM 1003 |
|---|---|---|---|---|---|
| % Pellet Solids by plant | | | 93.9% | 93.2% | 94.3% |
| Bulk Density (apparent) | | | | 41.9 | 44.3 |
| Nitrogen, Total N | 6.60 as TKN | 6.27 | 5.97 | 7.86 | 8.21 |
| Phosphate, Available P2O5 | 3.30 as P | 5.25 | 5.73 | 5.14 | 4.78 |
| Potassium, Water Soluble K2O | 0.31 as K | 0.60 | 2.30 | 6.89 | 8.37 |
| Nitrogen, Ammonia N | | 0.84 | 0.72 | 0.79 | 0.86 |
| Nitrogen, Nitrate N | | <0.01 | 0.01 | 0.04 | 0.02 |
| Nitrogen, Water Insoluble N | | 5.57 | 5.06 | 4.25 | 6.78 |
| Nitrogen, other Water Soluble N | | <0.01 | <0.01 | 0.68 | <0.01 |
| Nitrogen, Urea N | | 1.15 | 0.45 | 2.10 | 2.36 |
| Crush Strength, lbs | | | | 4.2 | 3.8 |
| Abrasion Resistance, % degradation | | | | 1.1 | 0.3 |
| Sieves, % — Tyler Mesh 5 (4.00 mm) | | <1 | | | 0.54 |
| 6 (3.36 mm) | | | | 10.58 | 12.18 |
| 7 (2.83 mm) | | | | 20.49 | 18.39 |
| 8 (2.38 mm) | | | | 27.66 | 17.93 |
| 9 (2.00 mm) | | | | 13.57 | 28.39 |
| 10 (1.68 mm) | | | | 11.67 | 8.05 |
| 12 (1.41 mm) | | | | 9.09 | 6.09 |
| 14 (1.19 mm) | | | | 4.75 | 3.68 |
| 16 (1.00 mm) | | | | 4.07 | 2.87 |
| >16 (<1 mm) | | | | 2.58 | 1.72 |

| | Jan. 17, 2012 9:30 PM 1004 | Jan. 18, 2012 2:30 AM 1005 | Jan. 18, 2012 6:30 AM 1006 | Jan. 18, 2012 10:00 PM 1007 | Jan. 19, 2012 2:00 AM 1008 | Jan. 19, 2012 6:00 AM 1009 | Jan. 19, 2012 2:30 PM 1010 | Jan. 19, 2012 6:30 PM 1011 | Jan. 12, 2012 Base Pellet 1012 air test sample |
|---|---|---|---|---|---|---|---|---|---|
| % Pellet Solids by plant | 96.3% | 95.6% | 95.8% | 96.9% | 95.7% | 98.2% | 96.6% | 94.4% | |
| Bulk Density (apparent) | 44.8 | 44.9 | 45.1 | 46.6 | 46.9 | 43.1 | 47.7 | 46.7 | 42.8 |
| Nitrogen, Total N | 8.53 | 8.62 | 8.02 | 8.58 | 8.97 | 9.09 | 8.90 | 8.62 | |
| Phosphate, Available P2O5 | 4.77 | 4.76 | 4.68 | 4.77 | 4.56 | 4.76 | 4.86 | 4.87 | |
| Potassium, Water Soluble K2O | 8.35 | 8.15 | 8.02 | 9.09 | 9.00 | 8.52 | 8.72 | 9.28 | |
| Nitrogen, Ammonia N | 0.85 | 0.81 | 0.81 | 0.95 | 0.94 | 1.00 | 0.92 | 0.95 | to be run |
| Nitrogen, Nitrate N | 0.04 | 0.06 | 0.04 | 0.03 | 0.03 | 0.02 | 0.25 | 0.24 | for |
| Nitrogen, Water Insoluble N | 3.99 | 3.93 | 4.12 | 4.15 | 4.12 | 4.18 | 4.13 | 4.95 | reference |
| Nitrogen, other Water Soluble N | <0.01 | 0.41 | 0.18 | 1.07 | 1.50 | 1.26 | 3.27 | <0.1 | sieve size |
| Nitrogen, Urea N | 3.81 | 3.41 | 2.87 | 3.33 | 3.32 | 3.63 | 3.72 | 3.27 | |
| Crush Strength, lbs | 5.5 | 6.5 | 6.1 | 6.10 | 7.4 | 8.4 | 4.9 | 6.2 | 3.5 |
| Abrasion Resistance, % degradation | 0.4 | 0.4 | 0.7 | 0.40 | 0.3 | 1.4 | 4.5 | 1.6 | 2.0 |
| Sieves, % — Tyler Mesh 5 (4.00 mm) | 1.42 | 0.59 | 0.64 | 0.40 | 1.09 | 1.10 | 0.52 | 0.48 | 0.19 |
| 6 (3.36 mm) | 21.65 | 17.73 | | 18.24 | 23.91 | 23.62 | 14.18 | 13.51 | 8.40 |
| 7 (2.83 mm) | 28.87 | 29.55 | 46.44 | 30.23 | 31.77 | 31.34 | 23.56 | 22.51 | 23.34 |
| 8 (2.38 mm) | 23.32 | 26.83 | 27.21 | 26.10 | 21.94 | 22.52 | 20.84 | 21.90 | 30.16 |
| 9 (2.00 mm) | 9.79 | 10.17 | 10.95 | 10.65 | 8.52 | 9.29 | 22.65 | 12.07 | 16.15 |
| 10 (1.68 mm) | 6.96 | 7.09 | 6.16 | 7.59 | 5.35 | 5.20 | 5.76 | 9.28 | 10.08 |
| 12 (1.41 mm) | 3.99 | 3.55 | 3.93 | 3.20 | 3.06 | 3.15 | 5.05 | 8.12 | 6.44 |
| 14 (1.19 mm) | 2.06 | 2.01 | 1.91 | 2.00 | 1.97 | 1.57 | 2.85 | 4.64 | 2.43 |
| 16 (1.00 mm) | 1.16 | 1.42 | 1.59 | 0.93 | 1.31 | 1.10 | 2.65 | 4.09 | 1.77 |
| >16 (<1 mm) | 0.77 | 1.06 | 1.17 | 0.67 | 1.09 | 1.10 | 1.94 | 3.41 | 1.03 |

| | Pellets in Dryer Outlet 1013 | Jan. 20, 2012 5:00 PM 1015 | Jan. 20, 2012 9:00 PM 1016 | Jan. 21, 2012 12:30 PM 1017 | Jan. 21, 2012 6:30 PM 1018 | Jan. 22, 2012 12:30 PM 1019 | Jan. 22, 2012 6:30 PM 1020 | Jan. 23, 2012 12:30 PM 1021 |
|---|---|---|---|---|---|---|---|---|
| Bulk Density (apparent) | 50.3 | 44.4 | 44.7 | 43.4 | 38.9 | 42.6 | 43.2 | 41.7 |
| Nitrogen, Total N | | 6.95 | 6.63 | 6.51 | 6.30 | 6.06 | 5.98 | 6.11 |
| Phosphate, Available P2O5 | | 5.79 | 6.01 | 6.40 | 6.20 | 6.19 | 5.92 | 6.13 |
| Potassium, Water Soluble K2O | | 6.43 | 5.55 | 3.87 | 3.30 | 1.77 | 1.50 | 1.31 |
| Nitrogen, Ammonia N | | 0.83 | 0.94 | 0.74 | 0.88 | 0.90 | 0.91 | 0.77 |
| Crush Strength, lbs | | 5.9 | 3.2 | 3.5 | 6.1 | 3.0 | 2.7 | 2.3 |
| Abrasion Resistance, % degradation | | 0.8 | 1.8 | 0.5 | 2.7 | 4.7 | 6.0 | 7.4 |

TABLE 3-continued

Test Results for Pilot Trials Conducted in January 2012
Thornton NPK Data for Bioblend 8-2-8 January 2012

| | | | | | | | |
|---|---|---|---|---|---|---|---|
| 2.86 | 0 | 0 | 0 | 0 | 0 | 0.38 | 0 |
| 8.69 | 2.39 | 1.75 | 1.15 | 1.56 | 0.15 | 0.51 | 0.37 |
| 16.26 | 10.62 | 9.12 | 7.27 | 6.37 | 2.68 | 3.8 | 2.33 |
| 20.55 | 21.51 | 19.77 | 18.71 | 17.43 | 9.99 | 11.41 | 9.21 |
| 9.92 | 18.19 | 16.26 | 19.75 | 16.38 | 15.35 | 13.56 | 14.62 |
| 10.02 | 16.07 | 17.43 | 21.59 | 22.37 | 19.82 | 12.8 | 16.46 |
| 6.54 | 14.87 | 17.31 | 18.82 | 20.03 | 24.59 | 13.94 | 28.62 |
| 4.40 | 7.44 | 8.77 | 6.93 | 9.49 | 14.31 | 7.73 | 12.29 |
| 3.89 | 5.71 | 6.08 | 3.93 | 6.37 | 13.11 | 6.72 | 9.71 |
| 16.87 | 3.19 | 3.51 | 1.73 | 0 | 0 | 29.15 | 6.39 |

TABLE 4

Test Results for Pilot Trials Conducted in February 2012
Thornton NPK Data for Bioblend II 8-2-8 February 2012

| | Historical Chemical Base Pellet | Jan. 11, 2012 Base Pellet | Mon Feb. 27, 2012 2001 Start Up nutrient start 9:00 am | Mon Feb. 27, 2012 2002 |
|---|---|---|---|---|
| Weighted Avg Particle Size, mm | | | | |
| % Pellet Solids by plant | | | | |
| Bulk Density (apparent) | | | | 38.6 |
| Nitrogen, Total N | 6.60 as TKN | | | 5.12 |
| Phosphate, Available P2O5 | 3.30 as P | | | 5.72 |
| Potassium, Water Soluble K2O | 0.31 as K | | | 0.92 |
| Nitrogen, Ammonia N | | | | 0.88 |
| Nitrogen, Nitrate N | | | | |
| Nitrogen, Water Insoluble N | | | | |
| Nitrogen, other Water Soluble N | | | | |
| Nitrogen, Urea N | | | | |
| Crush Strength, lbs | | | | 1.85 |
| Abrasion Resistance, % degradation | | | | too small, too soft |
| Sieves, % | | 5 | mm 4.00 | |
| | | 6 | 3.36 | |
| Tyler | | 7 | 2.83 | |
| Mesh | | 8 | 2.38 | |
| | | 9 | 2.00 | |
| | | 10 | 1.68 | |
| | | 12 | 1.41 | |
| | | 14 | 1.19 | |
| | | 16 | 1.00 | |
| | | >16 | <1 | |

| Mon Feb. 27, 2012 11:30 AM #12-#20 2003 | Mon Feb. 27, 2012 11:00 PM #12-#20 2004 | Tues Feb. 28, 2012 4:00 AM #8-#20 2005 | Tues Feb. 28, 2012 8:00 AM #8-#20 2006 | Tues Feb. 28, 2012 10:00 PM #8-#20 2007 | Tues Dryer Outlet? #8-#20 2008 | Tues Dryer Outlet? #8-#20 2009 | Wed Feb. 29, 2012 10:57 AM #8-#20 2010 | Wed Feb. 29, 2012 4:00 PM #8-#20 2011 |
|---|---|---|---|---|---|---|---|---|
| 1.326 | | | 1.748 | | | | | |
| 41.3 | 42.4 | 43.4 | 41.9 | | | | 41.7 | 44.3 |
| 7.55 | 7.38 | 7.86 | 8.10 | | | | 5.62 | 7.83 |
| 5.21 | 4.97 | 4.02 | 5.02 | | | | 6.50 | 5.42 |
| 6.70 | 8.06 | 8.41 | 8.63 | | | | 0.10 | 7.38 |
| 0.90 | 0.79 | 0.84 | 0.76 | | | | 0.9 | 0.84 |
| <0.01 | 0.03 | 0.04 | 0.03 | | | | <0.01 | 0.04 |
| 3.86 | 3.74 | 3.74 | 3.80 | | | | 4.91 | 4.11 |
| 0.23 | 0.02 | 0.40 | 0.43 | | | | <0.01 | 1.35 |
| 2.56 | 2.80 | 2.84 | 3.08 | | | | <0.01 | 2.33 |
| 1.85 | 1.85 | 2.3 | 3.2 | | | | 2.3 | 3.3 |

TABLE 4-continued

Test Results for Pilot Trials Conducted in February 2012
Thornton NPK Data for Bioblend II 8-2-8 February 2012

| | | | | | | | |
|---|---|---|---|---|---|---|---|
| too small, too soft | 5.9 | 3.4 | 3.6 | | | 5.3 | 3.2 |
| 0.00 | 0.00 | 0.00 | 0.00 | 0.00 | | 0.00 | 0.00 |
| 0.00 | 0.00 | 0.00 | 0.00 | 0.00 | | 0.00 | 0.00 |
| 0.00 | 0.06 | 0.00 | 0.00 | 0.00 | | 0.00 | 0.00 |
| 0.00 | 7.83 | 7.42 | 5.58 | 23.00 | | 3.17 | 8.05 |
| 0.00 | 18.40 | 23.78 | 17.28 | 50.00 | | 16.04 | 28.02 |
| 0.00 | 16.85 | 18.71 | 16.74 | 29.10 | | 23.08 | 24.15 |
| 22.66 | 23.54 | 18.41 | 17.95 | 28.40 | | 24.35 | 19.66 |
| 29.05 | 13.20 | 11.83 | 13.95 | 17.10 | | 13.91 | 9.29 |
| 27.86 | 12.01 | 12.37 | 17.10 | 15.10 | | 13.56 | 7.74 |
| 20.42 | 8.12 | 7.48 | 11.14 | 10.90 | | 5.89 | 3.10 |

| Wed Feb. 29, 2012 8:00 PM #8-#20 2012 | Thurs Mar. 1, 2012 12:00 AM #8-#20 2013 | Thurs Mar. 1, 2012 4:00 AM #8-#20 2014 | Thurs Mar. 1, 2012 6:30 AM #8-#20 2015 | Thurs Mar. 1, 2012 8:00 AM #8-#20 2016 | Thurs Mar. 1, 2012 10:45 AM #8-#20 2017 | Thurs Mar. 1, 2012 11:30 AM #8-#20 2018 |
|---|---|---|---|---|---|---|
| 45.2 | 44.4 | 44.1 | 44.7 | 43.6 | 42.4 | 44.9 |
| 8.35 | 8.28 | 8.14 | 8.14 | 7.44 | 6.64 | 7.98 |
| 5.13 | 5.13 | 4.9 | 5.5 | 5.83 | 6.12 | 5.03 |
| 7.51 | 8.21 | 8.63 | 8.62 | 6.78 | 3.92 | 8.53 |
| 0.9 | 0.88 | 0.86 | 0.87 | 0.9 | 0.74 | 0.8 |
| 0.05 | 0.09 | 0.11 | 0.04 | 0.02 | 0.02 | 0.07 |
| 4.06 | 3.96 | 3.92 | 3.92 | 4.4 | 4.81 | 3.84 |
| 0.77 | 0.46 | 0.06 | 0.55 | <0.1 | 0.01 | 0.58 |
| 2.57 | 2.89 | 3.29 | 2.76 | 2.13 | 0.33 | 2.69 |
| 4.0 | 5.0 | 4.7 | 4.7 | 3.2 | 2.5 | 3.5 |
| 2.1 | 0.6 | 1.4 | 3.5 | 2.0 | 8.2 | 4.2 |
| 0.00 | | | | | | |
| 0.00 | | | | | | |
| 0.00 | | | | | | |
| 6.91 | | | | | | |
| 24.85 | | | | | | |
| 24.63 | | | | | | |
| 20.81 | | | | | | |
| 10.44 | | | | | | |
| 8.97 | | | | | | |
| 3.38 | | | | | | |

Example 2

Product Compositions and Comparative Compositions

Test compositions for the present biosolids product were made to determine on a laboratory bench scale, if products have a NPK analysis of 8-2-8 or 10-2-10 could result from the process of the invention wherein added nutrients of nitrogen and potassium would not separate from the biosolids component of the product.

With specific reference to unite operations of the process, the tests would show that the present biosolids product could be mixed with recycled dried pellets to achieve a physical form that could be presented to a rotary dryer with an expectation that the nutrients would not separate from the main sludge mass during the process of building pellets by coating them with sludge and nutrients. Dry blending with dried sludge pellets and nutrients results in the problem of particle segregation in a variety of material sizes and densities. Wet blending causes the problem of near spontaneous heating due to the amounts of water required. The present process and resulting product takes sludge cake as a starting material and avoids subsequent product heating by thermally separating the water from the product. Addition of nutrients in the process, after drying does not enable incorporation of high nutrient concentrations and thus insufficient to produce the desired NPK 8-2-8 and 10-2-10 biosolids product.

Twenty laboratory compositions used combinations of ammonium sulfate with muriate of potash (potassium chloride) and sulfate of potash (potassium sulfate) and it used combinations of urea with the same potassium nutrients. Historically, sludge cake destined for pellet formation in a dryer is added to recycle pellets in a relatively high intensity mixer. In the initial trials, the addition of the dry nutrients to the dry pellets followed by the mixing with cake using an electric kitchen mixer produced products that were typically too wet or too segregated to produce a homogeneous product. The nutrients were then added to the cake in advance of its mix with dried pellet product creating material that could be fed to a drying system. Mixes were produced and dried in a laboratory oven and tested for total nitrogen, Total phosphorus as $P_2O_5$, total potassium as $K_2O$, bulk density, apparent density, true density, crush strength and abrasion resistance. The trial mixes showed that a product having an NPK of 10-2-10 was possible when the materials were mixed in the order of nutrients to sludge cake followed by the comingling of the premix with recycle pellets.

A Sunbeam Mix Master™ kitchen mixer was used in the lab to simulate a small scale paddle mixer or pin mill. The low shear mixer had an adjustable bowl positioner and two variable speed mixing blades to perform thorough mixing of the biomass wet cake and recycle pellets with predetermined amounts of nutrients. The material was mixed from 5 to 15 minutes until the nutrients were thoroughly incorporated into the batch. The mix was then placed in a 14 inch diameter lab scale drum dryer/granulator to determine if the material would roll into the desired particle sizes produced at Synagro, Inc., Houston, Tex. pelletizer sites. Any tendency for nutrients to separate were also noted in this step. A portable heating gun was used to warm the mix to simulate the drying system commonly used.

Testing originally involved ammonium sulfate. Mixing was attempted with various addition sequences and with various grades of nutrient. The best mix obtained involved addition the nutrient to the wet cake prior to mixing with recycle pellets. All other mixes showed varying degrees of nutrient separation. While continuing to premix nutrient into wet cake, the nitrogen source was switched to granular urea. When added to the cake, the urea was found to produce a more fluid mix having the consistency of pudding. Subsequent test mixes with urea and potassium chloride were run to adjust the water content of the mix prior to placing it in the lab drum dryer. Urea-potassium sulfate mixes were attempted next. The initial trial produced a good mix but the technician felt that it was even better when the recycle pellets were first heated to 140° F. prior to blending them with the premix. The testing returned to the urea-potassium chloride combination. Mixes were acceptable but adjustments continued to be made to water content. The preheating of the recycle pellets was raised to 170° F. during this series as a means of trying to control the water content of the batches.

During the lab scale mixing trials, the recycled pellets were warmed to mimic their condition in most pelletizing plant operations. These temperatures are typically between 130° F. and 170° F. once the recycle bin is refilled with new process material. The main focus of the heat gun in the bench trials was to determine if the homogeneous nature of the mix would stay intact while the batch was rolling and undergoing thermal drying. Since the laboratory was able to successfully make 10-2-10 mixes, it is important to make sure that the premix contains enough water to make the nutrients initially soluble in the mix if higher NPK values are desired. One means of accomplishing that end is to warm the incoming wet cake to achieve higher nutrient solubilities based on temperature. Warming the sludge also improves its rheology, enhancing the nutrient mixing process. Cake temperatures up to 140° F. would work well. A maximum temperature for this application would be 176° F.

Five mixes each of urea-potassium sulfate and urea-potassium chloride were made and continuously fed to the small pilot plant pin mixer to see how they would fare in that equipment. Both mixes ran well. Two batches of sewage sludge cake and recycled pellets were made in the laboratory equipment as reference samples for comparison of physical properties with the trial mixes. After successfully producing 10-2-10 products, two 5-2-5 mixes were made with urea and potassium sulfate or potassium chloride. Both trials looked homogeneous and ran well through the pilot pin mixer. A single trial with prilled urea and potassium chloride was conducted and ran well. The urea once again produced a fluid cake with a pudding consistency. Two final trials were run with ammonium sulfate as the nitrogen source with potassium sulfate and then potassium chloride as the potash. These mixes did not look as well as the urea based mixes having a salt and pepper appearance.

The trial mixes were placed in trays and dried in convection ovens with samples tested for physical properties. A number of the mixes were found to have little to no physical separation of nutrients from the main mass.

Selected mixes were tested for physical properties (bulk density, true density, apparent density, crush strength and percent abrasion and vertical entrainment velocity).

Tests of Product and Process

In the Test #1, all of the ingredients were added to the kitchen mixer. After mixing thoroughly, a few scoops of the mix was transferred to the laboratory drum drier and dried with a hot air gun. The observation was made that not all of the ammonium sulfate had been incorporated into the mix. It was also observed that the mix appeared to be too wet. A moisture analysis was performed on the mix using a moisture balance and the resulting moisture was 38.9% water. From the results of Test #1, the ratio of cake to recycle was adjusted to provide a drier mix and the source of ammonium sulfate was changed to feed grade ammonium sulfate screened to less than 0.85 millimeter (20 Tyler mesh). In Test #2, all of the ingredients were combined in the kitchen mixer and mixed thoroughly. The batch appeared to be too dry and produced small particles when a few scoops were placed in a food processor to simulate a pin mill. It was also noted that not all of the ammonium sulfate was incorporated into the mix. From the results of the first two tests, the decision was made to alter the order of addition to allow for better mixing of the nutrients. In Test #3, the cake and nutrients were added to the kitchen mixer and allowed to thoroughly mix to dissolve the added nutrients. After the nutrients and cake were mixed well, the recycle was added to the kitchen mixer while continuing to mix. The observation was made that there was very little ammonium sulfate visible. The mix began to form large particles in the mixer. A moisture analysis was performed on the mix using a moisture balance and the resulting moisture was 36.65% water. The mix was transferred to the laboratory drum drier and dried with a hot air gun. As the particles began to dry, they began to break down into smaller particles. The dried material was removed from the drum and placed in a laboratory oven to finish drying. From the results of Test #3, the decision was made to try and add all of the ingredients into the mixer together again using ammonium sulfate screened to less than 0.5 millimeters (32 Tyler mesh).

In Test #4, all of the ingredients were added to the kitchen mixer and allowed to mix thoroughly. The mix had a salt and pepper appearance from the nutrients not incorporating well into the mix. The mix was transferred to the laboratory drum drier and dried with a hot air gun. The dried material was removed from the drum and placed in a laboratory oven to finish drying. Based on the results of Test #4, the order of addition appeared to have an effect on the incorporation of the nutrients. To verify the effect of the order of addition on the incorporation of the nutrients, Test #5 was performed using the ammonium sulfate screened to less than 0.5 millimeter (32 Tyler mesh) and the nutrients and recycle were added to the kitchen mixer. After thoroughly mixing, the cake was added while continuing to mix. The nutrients did not appear to be incorporated into the mix very well. The mix was transferred to the laboratory drum drier and dried with a hot air gun. The dried material was removed from the drum and placed in a laboratory oven to finish drying.

TABLE 5

Test #1, Test #2, Test #3, Test #4 & Test #5 Parameters

| Test # | Recycle wt grams | Cake wt grams | Potassium Chloride wt grams | Ammonium Sulfate wt grams | Ammonium Sulfate Size |
|---|---|---|---|---|---|
| 1 | 300 | 568.2 | 125 | 250 | Milled |
| 2 | 350 | 340.9 | 125 | 250 | <0.85 mm |
| 3 | 300 | 568.2 | 125 | 250 | <0.85 mm |

TABLE 5-continued

Test #1, Test #2, Test #3, Test #4 & Test #5 Parameters

| Test # | Recycle wt grams | Cake wt grams | Potassium Chloride wt grams | Ammonium Sulfate wt grams | Ammonium Sulfate Size |
|---|---|---|---|---|---|
| 4 | 300 | 568.2 | 125 | 250 | <0.50 mm |
| 5 | 300 | 568.2 | 125 | 250 | <0.50 mm |

Based on the observations from the first five tests, the decision was made that the addition of the nutrients to the cake provides the best incorporation into the mix. The decision was also made to replace ammonium sulfate with urea as the nitrogen source because of difference in solubility (urea more soluble that ammonium sulfate) and the amount of ammonium sulfate required to produce a 10-2-10 product. In Test #6, the nutrient sources were potassium chloride and urea milled in a coffee grinder. The nutrients and cake were added to the kitchen mixer and allowed to mix thoroughly. As the urea began to mix into the cake, the mix became more fluid and developed a pudding consistency. The recycle was added to the mixer while still mixing. The mix remained extremely wet, so additional recycle was added to dry out the mix. After the mix was dried out, some of the batch was transferred to the laboratory drum drier and dried with a hot air gun. The dried material was removed from the drum and placed in a laboratory oven to finish drying. From the results of Test #6, the ratio of cake to recycle was adjusted to lower the moisture level in the batch. In Test #7, the nutrients, cake, and half of the recycle was place in the kitchen mixer and mixed thoroughly. The remaining recycle was added while mixing. The observation was made that the potassium chloride did not dissolve into the mix very well. The batch was discarded. From the results of Test #7, the test was repeated with the nutrients and cake only added to the kitchen mixer and mixed thoroughly. In Test #8, the nutrients and cake were added to the kitchen mixer and allowed to mix thoroughly. As the urea began to dissolve into the cake, the mix became more fluid and developed a pudding consistency. The recycle was added to the mixer while continuing to mix. The mix remained too wet, so additional recycle was added to the mixer to dry the batch. The batch was discarded.

From the results of Test #8, the ratio of cake to recycle was adjusted further to lower the moisture load of the batch. In Test #9, the nutrients and cake were added to the kitchen mixer and mixed thoroughly. As the urea began to dissolve into the cake, the mix became more fluid and developed a pudding consistency. The recycle was added to the mixer while continuing to mix. The mix still appeared a little wet, so a few scoops were transferred to the laboratory drum drier and dried with a heat gun. The dried material was returned to the mixer and allowed to mix well. A moisture analysis was performed on the mix in the moisture balance and the resulting moisture was 25.55% water. The mix was transferred to the laboratory drum drier and dried with a hot air gun to 170° F. The dried material was removed from the drum and placed in a laboratory oven to finish drying.

TABLE 6

Test #6, Test #7, Test #8 & Test #9 Parameters

| Test # | Recycle wt grams | Cake wt grams | Potassium Chloride wt grams | Urea wt grams |
|---|---|---|---|---|
| 6 | 650 | 568.2 | 150 | 150 |
| 7 | 425 | 340.9 | 150 | 150 |
| 8 | 575 | 340.9 | 150 | 150 |
| 9 | 440 | 272.7 | 150 | 150 |

From the results of Test #9, the decision was made to change to potassium sulfate and urea as the nutrient sources. In Test #10, the nutrients and cake were added to the kitchen mixer and allowed to mix thoroughly. As the urea began to dissolve into the cake, the mix became more fluid and developed a pudding consistency. The recycle was added to the mixer while continuing to mix. The mix looked very good and was transferred to the laboratory drum drier and dried with a hot air gun. The dried material was removed from the drum and placed in a laboratory oven to finish drying. From the results of Test #10, the decision was made to start heating the recycle to 140° F. The ratio of cake to recycle was also adjusted to increase the moisture level in the batch. In Test #11, the nutrient and cake were added to the kitchen mixer and allowed to mix thoroughly. As the urea began to dissolve into the cake, the mix became more fluid and developed a pudding consistency. The hot recycle was added to the mixer while continuing to mix. The mix looked very good. A moisture analysis was performed on the mix in the moisture balance and the resulting moisture was 30.72% water. The mix was transferred to the laboratory drum drier and dried with a hot air gun to 170° F. The dried material was removed from the drum and placed in a laboratory oven to finish drying.

TABLE 7

Test #10 & Test #11 Parameters

| Test # | Recycle wt grams | Cake wt grams | Potassium Sulfate wt grams | Urea wt grams |
|---|---|---|---|---|
| 10 | 475 | 227.3 | 160 | 115 |
| 11 | 450 | 340.9 | 160 | 115 |

From the results of Test #11, the decision was made to swap back to potassium chloride and urea as the nutrient sources and use heated recycle. In Test #12, the nutrients and cake were added to the kitchen mixer and allowed to mix thoroughly. As the urea began to dissolve into the cake, the mix became more fluid and developed a pudding consistency. The hot recycle was added to the mixer while continuing to mix. The mix looked good, but still a little wet. A moisture analysis was performed on the mix in the moisture balance and the resulting moisture was 29.63% water. The mix was transferred to the laboratory drum drier and dried with a hot air gun to 170° F. The dried material was removed from the drum and placed in a laboratory oven to finish drying. From the results of Test #12, the decision was made to adjust the ratio of cake to recycle to lower the moisture level in the batch. In Test #13, the nutrients and cake were added to the kitchen mixer and allowed to mix thoroughly. As the urea began to dissolve into the cake, the mix became more fluid and developed a pudding consistency. The hot recycle was added to the mixer while continuing to mix. The mix looked good, but still a little wet. A moisture analysis was performed on the mix in the moisture balance and the resulting moisture was 27.76% water. The mix was transferred to the laboratory drum drier and dried with a hot air gun to 170° F. The dried material was removed from the drum and placed in a laboratory oven to finish drying.

TABLE 8

Test #12 & Test #13 Parameters

| Test # | Recycle wt grams | Cake wt grams | Potassium Chloride wt grams | Urea wt grams |
|---|---|---|---|---|
| 12 | 425 | 340.9 | 150 | 150 |
| 13 | 440 | 272.7 | 150 | 150 |

From the success of the small batch tests, the decision was made to produce larger quantities of Test #11 and Test #13 to run through the small pin mill. Five batches of each test were mixed and placed in a bucket for processing in the small pin mill. In Pin Mill Test #1, the Test #11 batches were fed though the pin mill. A moisture analysis was performed on the mix in the moisture balance and the resulting moisture was 31.03% water. The material that was discharged from the pin mill looked good. It was placed in the laboratory oven to dry. In Pin Mill Test #2, the Test #13 batches were fed though the pin mill. A moisture analysis was performed on the mix in the moisture balance and the resulting moisture was 25.9% water. The material that was discharged from the pin mill looked good. It was placed in the laboratory oven to dry.

TABLE 9

Pin Mill Test #1 and Pin Mill Test #2 Parameters

| Test # | Recycle wt grams | Cake wt grams | Potassium Source | Potassium Source wt grams | Urea wt grams |
|---|---|---|---|---|---|
| Pin Mill 1 | 2250 | 1704.5 | Potassium Sulfate | 800 | 575 |
| Pin Mill 2 | 2200 | 1363.5 | Potassium Chloride | 750 | 750 |

As a comparison to the biosolids products of the present invention, a base line was performed mixing the cake and recycle in the kitchen mixer. In Test #14, the cake was added to the kitchen mixer and the hot recycle was added while mixing. The mix looked good and was transferred to the laboratory oven to dry. In Test #15, the hot recycle was added to the kitchen mixer and the cake was added while mixing. The mix looked a little dry. The mix was transferred to the laboratory oven to dry.

TABLE 10

Test #14 & Test #15 Parameters

| Test # | Recycle wt grams | Cake wt grams |
|---|---|---|
| 14 | 420 | 420 |
| 15 | 420 | 420 |

From the success at producing a 10-2-10 biosolids product of the present invention, two different 5-2-5 present biosolids products were made. In Test #16, the nutrient source was potassium sulfate and urea. The cake and nutrients were added to the kitchen mixer and allowed to mix thoroughly. As the urea began to dissolve into the cake, the mix became more fluid and developed a pudding consistency. The hot recycle was added to the mixer while continuing to mix. The mix was placed in a bucket to run through the pin mill. The batch was repeated to provide enough material for the pin mill. A moisture analysis was performed on the mix in the moisture balance and the resulting moisture was 30.15% water. The mix was fed though the pin mill with no problems. The material that was discharged from the pin mill looked good. It was placed in the laboratory oven to dry. In Test #17, the nutrient source was potassium chloride and urea. The cake and nutrients were added to the kitchen mixer and allowed to mix thoroughly. As the urea began to dissolve into the cake, the mix became more fluid and developed a pudding consistency. The hot recycle was added to the mixer while continuing to mix. The mix was placed in a bucket to run through the pin mill. The batch was repeated to provide enough material for the pin mill. A moisture analysis was performed on the mix in the moisture balance and the resulting moisture was 35.55% water. The mix was fed though the pin mill with no problems. The material that was discharged from the pin mill looked good. It was placed in the laboratory oven to dry.

TABLE 11

Test #16 & Test #17 Parameters

| Test # | Recycle wt grams | Cake wt grams | Potassium Source | Potassium Source wt grams | Urea wt grams |
|---|---|---|---|---|---|
| 16 | 1210 | 909 | Potassium Sulfate | 170 | 20 |
| 17 | 1210 | 1045.4 | Potassium Chloride | 140 | 20 |

In Test #18, the addition of potassium chloride and prilled urea was tested. The nutrients and cake were added to the kitchen mixer and allowed to mix thoroughly. As the urea began to dissolve into the cake, the mix became more fluid and developed a pudding consistency. The hot recycle was added to the mixer while continuing to mix. The use of prilled urea required more mixing time for all of the urea to disperse into the mix. The mix was placed in a bucket to run through the pin mill. The batch was repeated to provide enough material for the pin mill. A moisture analysis was performed on the mix in the moisture balance and the resulting moisture was 30.64% water. The mix was fed though the pin mill with no problems. The material that was discharged from the pin mill looked good. It was placed in the laboratory oven to dry.

TABLE 12

Test #18 Parameters

| Test # | Recycle wt grams | Cake wt grams | Potassium Chloride wt grams | Urea wt grams |
|---|---|---|---|---|
| 8 | 880 | 681.8 | 300 | 300 |

In Test #19, the nutrient sources were potassium chloride and ammonium sulfate screened to less than 0.5 millimeter (32 Tyler mesh). The nutrients and cake were added to the kitchen mixer and allowed to mix thoroughly. The hot recycle was added to the mixer while continuing to mix. The mix was placed in a bucket to run through the pin mill. The batch was repeated to provide enough material for the pin mill. A moisture analysis was performed on the mix in the moisture balance and the resulting moisture was 36.10% water. The mix did not feed through the pin mill very well. The material that was discharged from the pin mill did not look as good as Test #18. It was placed in the laboratory oven to dry.

TABLE 13

Test #19 Parameters

| Test # | Recycle wt grams | Cake wt grams | Potassium Chloride wt grams | Ammonium Sulfate wt grams | Ammonium Sulfate Size |
|---|---|---|---|---|---|
| 19 | 600 | 1136.4 | 250 | 500 | <0.50 mm |

In Test #20, the nutrient sources were potassium sulfate and ammonium sulfate screened to less than 0.5 millimeter (32 Tyler mesh). The nutrients and cake were added to the kitchen mixer and allowed to mix thoroughly. The hot recycle was added to the mixer while continuing to mix. The mix was placed in a bucket to run through the pin mill. The batch was repeated to provide enough material for the pin mill. A moisture analysis was performed on the mix in the moisture balance and the resulting moisture was 33.29% water. The mix did not feed through the pin mill very well and finally plugged the pin mill. The material that was discharged from the pin mill did not look as good as Test #18. It was placed in the laboratory oven to dry.

TABLE 14

Test #20 Parameters

| Test # | Recycle wt grams | Cake wt grams | Potassium Sulfate wt grams | Ammonium Sulfate wt grams | Ammonium Sulfate Size |
|---|---|---|---|---|---|
| 20 | 600 | 909 | 300 | 500 | <0.50 mm |

To address a different project objective (autoxidation causing self-heating), an antioxidant, CIBA IRGANOX 1135™, was sprayed onto Synagro Inc.'s finished product in the ACT (Applied Chemical Technology, Inc., Florence, Ala.) 100N laboratory fluid bed equipped with the top spray assembly. In Test #21, a 600 gram batch of pellets without oil coating was charged into the fluid bed. The spray line was primed with IRGANOX. Once the line was primed, the IRGANOX bottle was tared out. The fluid bed was started. The atomization air was set at 10 psig. The IRGANOX was sprayed for 30 seconds at 10 milliliters/min. After 30 seconds, the spray was stopped and the fluid bed turned off. The IRGANOX was weighed and 17 grams was applied to the pellets. There was no dust present when the treated pellets were emptied from the fluid bed. In Test #22, a 600 gram batch of pellets without oil coating was charged into the fluid bed. The spray line was primed with IRGANOX. Once the line was primed, the IRGANOX bottle was tared out. The fluid bed was started. The atomization air was set at 10 psig. The IRGANOX was sprayed for 10 seconds at 10 milliliters/min. After 10 seconds, the spray was stopped and the fluid bed turned off. The IRGANOX was weighed and 4.8 grams was applied to the pellets. There was no dust present when the treated pellets were emptied from the fluid bed. In Test #23, a 600 gram batch of pellets with oil coating was charged into the fluid bed. The spray line was primed with IRGANOX. Once the line was primed, the IRGANOX bottle was tared out. The fluid bed was started. The atomization air was set at 10 psig. The IRGANOX was sprayed for 30 seconds at 10 milliliters/min. After 10 seconds, the spray was stopped and the fluid bed turned off. The IRGANOX was weighed and 6.0 grams was applied to the pellets. There was no dust present when the treated pellets were emptied from the fluid bed.

Chemical and Physical Property Analysis

The week of Aug. 16-20, 2010, Applied Chemical Technology conducted a total of 22 granulations tests in an effort to produce a granular Enriched Bio-Solids fertilizer. During this series of testing two formulations were produced and several alternative nutrient sources were utilized. ACT was successful at producing granular fertilizers of the present invention with nutrient contents in the range of 10% nitrogen, 2% phosphate, and 10% potassium as well as a product containing 5% nitrogen, 2% phosphate, and 5% potassium. The bio-solids sludge already contained sufficient quantities of phosphate to meet the desired formulation requirements; however sources of nitrogen and potassium were needed to reach product specifications. Two sources of nitrogen (prilled urea and crystals of ammonium sulfate) were utilized during these bench scale experiments to determine their effects on granulation and product quality. Also, crystals of potassium sulfate and crystals of potassium sulfate were utilized during these studies as alternative potassium sources. Of the 22 samples produced seven (7) different potential product scenarios were selected for chemical analysis and physical properties testing.

Chemical Analysis was conducted on each of the seven (7) product variation. The following tests were performed on each fertilizer sample to determine product quality:

| | |
|---|---|
| Total Nitrogen | Leco Combustion Method) |
| Total Phosphorus | (Atomic Absorption Method) |
| Total Potassium | (Atomic Absorption Spectrophotometer Method) |

Chemical Analysis results for each product analyzed are listed in the table below.

TABLE 15

Chemical Analysis Results

| Test # | Total Nitrogen (%) | Total $P_2O_5$ (%) | Total $K_2O$ (%) |
|---|---|---|---|
| 3 | 9.18 | 4.47 | 7.83 |
| 14 (baseline) | 4.68 | 7.23 | 0.30 |
| 16 | 6.08 | 7.21 | 3.56 |
| 17 | 5.27 | 7.45 | 4.65 |
| 18 | 10.86 | 6.09 | 8.34 |
| 20 | 8.38 | 4.59 | 4.81 |
| Pin Mill 1 | 10.29 | 5.63 | 7.15 |

Physical properties of fertilizers are important in processing, handling, transportation, bagging, storage, and application. Most of the problems encountered with fertilizers probably are those resulting from deficiencies in physical properties; frequent problems include those associated with caking, dustiness, poor flowability, and segregation. Physical properties of fertilizer products should be such that the material remains free flowing, relatively non-dusty, and can withstand a reasonable amount of exposure to normal handling, transport, and storage steps that usually are involved between production and the end use.

Physical Property Analysis were conducted on each of the seven (7) product variation. The following standard tests were performed on each fertilizer sample to determine product quality:

| Property | Test Procedure (International Fertilizer Development Center (IFDC)) |
|---|---|
| Bulk Density (Loose Pour) | IFDC S-111 |
| Apparent Density | IFDC S-113 |
| True Density | IFDC S-114 |
| Granule Crush Strength | IFDC S-115 |
| Abrasion Resistance | IFDC S-116 |

Physical Property Analysis for each product analyzed are listed in the table below.

TABLE 16

Physical Property Analysis Results

| Test # | Bulk Density (lb/ft$^3$) | True Density (g/cm$^3$) | Apparent Density (g/cm$^3$) | Crush Strength (lbs) | Abrasion (%) |
|---|---|---|---|---|---|
| 3 | 45.06 | 1.658 | 1.0392 | 1.71 | 4.75 |
| 14 (baseline) | 43.01 | 1.457 | 0.9230 | 2.51 | 2.95 |
| 16 | 41.95 | 1.559 | 0.9300 | 2.53 | 14.80 |
| 17 | 42.78 | 1.523 | 0.7921 | 2.21 | 8.90 |
| 18 | 41.53 | 1.497 | 0.8733 | 2.58 | 7.30 |
| 20 | 35.33 | 1.607 | 0.9413 | 2.11 | 9.50 |
| Pin Mill 1 | 48.23 | 1.574 | 0.9261 | 2.72 | 3.20 |

A summary of the tests and test results for the biosolids product and process of the present invention is shown in below Table 17, labeled "Biosolids Product Compositions with Properties," and Table 18, labeled "Biosolids Product Physical Properties."

TABLE 17

Biosolids Product Compositions with Properties
Present Biosolids Product Mixes Made at ACT Week of Aug. 16, 2010

| Mix Numbers | No of Mixes | N source | K Source |
|---|---|---|---|
| 20 | 1 | AmSO4 | K2SO4 |
| 1, 2, 3, 4, 5, 19 | 6 | AmSO4 | KCl |
| 10, 11, 16 | 3 | Urea | K2SO4 |
| 6, 7, 8, 9, 12, 13, 17, 18 | 8 | Urea | KCl |
| no nutrient, base pellet mixes | 2 | — | — |

| Test Mix Number | Cake, gms | Recycle, gms | N Source | N grams | K Source | K grams | % Solids |
|---|---|---|---|---|---|---|---|
| 1 | 568 | 300 | AmSO4 | 250 | KCl | 125 | 31 |
| 2 | 350 | 350 | AmSO4 | 250 | KCl | 125 | 31 |
| 3, 1st premix of nutrients and cake | 568 | 300 | AmSO4 | 250 | KCl | 125 | 37 |
| 4 | 568 | 300 | AmSO4 | 250 | KCl | 125 | 37 |
| 5 | 568 | 300 | AmSO4 | 250 | KCl | 125 | 37 |
| 6 | 568 | 375 | Urea | 150 | KCl | 150 | n/a |
| 7 | 341 | 425 | Urea | 150 | KCl | 150 | n/a |
| 8 | 241 | 425 | Urea | 150 | KCl | 150 | n/a |
| 9 | 273 | 440 | Urea | 150 | KCl | 150 | 28 |
| 10 | 227 | 475 | Urea | 115 | K2SO4 | 160 | n/a |
| 11, 1st heated recycle | 341 | 460 | Urea | 115 | K2SO4 | 160 | 31 |
| 12 | 341 | 425 | Urea | 150 | KCl | 150 | 30 |
| 13, w powder urea, compare to 18 | 273 | 440 | Urea | 150 | KCl | 150 | 28 |
| 14, base pellet | 420 | 420 | Test 14 is a base pellet mix, pellet into cake | | | | n/a |
| 15, base pellet | 420 | 420 | Test 15 is a base pellet mix, cake into pellet | | | | n/a |
| 16, 5-3-5 | 455 | 605 | Urea | 10 | K2SO4 | 85 | 30 |
| 17, 5-3-5 | 523 | 605 | Urea | 10 | KCl | 70 | 36 |
| 18, with prilled urea, compare to 13 | 341 | 440 | Urea | 150 | KCl | 150 | 31 |
| 19 | 568 | 300 | AmSO4 | 250 | KCl | 150 | 36 |
| 20 | 455 | 300 | AmSO4 | 250 | K2SO4 | 125 | 33 |
| Pin Mill Test 1 | 1706 | 2250 | Urea | 575 | K2SO4 | 800 | 31 |
| Pin Mill Test 2 | 1365 | 2300 | Urea | 750 | KCl | 750 | 36 |

| Test Mix Number | Visual | Projected Analysis | Comments | |
|---|---|---|---|---|
| 1 | wet | 9.5-1.6-9.4 | AmSO4 didn't dissolve well | 1 |
| 2 | dry | | aborted the mix | 2 |

TABLE 17-continued

Biosolids Product Compositions with Properties
Present Biosolids Product Mixes Made at ACT Week of Aug. 16, 2010

| | | | | |
|---|---|---|---|---|
| 3, 1st premix of nutrients and cake | | 9.5-1.6-9.4 | Premixed cake and nutrients before recycle | 3 |
| 4 | salt & pepper | | No premix, all combined | 4 |
| 5 | nutrient didn't mix well | used screened 32 mesh AmSO4 | Premixed cake and nutrients before recycle | 5 |
| 6 | too wet, added rcy to dry | | Premixed cake and nutrients before recycle | 6 |
| 7 | didn't mix well | 11.8-1.9-11.3 | Premixed cake and nutrients and ½ of recycle | 7 |
| 8 | too wet | | Premixed cake and nutrients then added recycle | 8 |
| 9 | drum granulation and drying looked good | 11.8-1.9-11.3 | Premixed cake and nutrients then preheated some recycle in drum before adding mix to recycle | 9 |
| 10 | drum granulation and drying looked good | 10-2-10 | Premixed cake and nutrients before recycle | 10 |
| 11, 1st heated recycle | drum granulation and drying looked good | 10-2-10 | Premixed cake and nutrients in pellets at 140° F. | 11, 1st heated recycle |
| 12 | too wet, clumped in drum | 11.8-1.9-11.3 | Premixed cake and nutrients in pellets at 140° F. | 12 |
| 13, w powder urea, compare to 18 | too wet, clumped in drum | 11.8-1.9-11.3 | Premixed cake and nutrients in pellets at 140° F. pin milled afterwards | 13, w powder urea, compare to 18 |
| 14, base pellet | drum granulation and drying looked good | | Added pellets into cake | 14, base pellet |
| 15, base pellet | no difference with 14 | | Added cake into pellets | 15, base pellet |
| 16, 5-3-5 | | 5.0-2.6-5.3 | Premixed nutrient and cake into pellets at 140° F. | 16, 5-3-5 |
| 17, 5-3-5 | | 6.1-2.7-5.3 | Premixed nutrient and cake into pellets at 140° F. | 17, 5-3-5 |
| 18, with prilled urea, compare to 13 | | 11.8-1.9-11.3 | Premixed nutrient and cake into pellets at 140° F. demonstration of use of prills without milling | 18, with prilled urea, compare to 13 |
| 19 | | 9.5-1.6-9.4 | Did not want to flow thru pin mill, particles too large | 19 |
| 20 | | 8.3-1.5-9.4 | Looked good in mixer, plugged pin mill, particles got larger as they passed through the pin mill, very odorous | 20 |
| Pin Mill Test 1 | pin mill granulation was good | | Premix cake and nutrients in pellets at 140° F. | Pin Mill Test 1 |
| Pin Mill Test 2 | pin mill granulation was good | | Premix cake and nutrients in pellets at 140° F. | Pin Mill Test 2 |

TABLE 18

Biosolids Product Physical Properties
August 2010 Present Biosolids Product Bench Trial Physical Properties

| Mix No. | N | K | Bulk Density lb/ft3 | TRUE Density gm/cm3 | Apparent Density gm/cm3 | Crush Strength lbs | Abrasion % Degradation | Entrainment Velocity FPM | N % | P % | K % | Calculated NPK before mix |
|---|---|---|---|---|---|---|---|---|---|---|---|---|
| 3 | AmSO4 | KCl | 45.06 | 1.658 | 1.039 | 1.71 | 4.75 | | 9.18 | 4.47 | 7.83 | 9.5/1.6/9.4 |
| 14 | base - no nutrients | | 43.01 | 1.457 | 0.923 | 2.51 | 2.95 | | 4.68 | 7.23 | 0.30 | |
| 16 | Urea, granular | K2SO4 | 41.95 | 1.559 | 0.930 | 2.53 | 14.8 | | 6.08 | 7.21 | 3.56 | 5.0/2.6/5.3 |
| 17 | Urea, granular | KCl | 42.78 | 1.523 | 0.792 | 2.21 | 8.9 | | 5.27 | 7.45 | 4.65 | 5.1/2.7/5.3 |
| 18 | Urea, prilled | KCl | 41.53 | 1.497 | 0.873 | 2.58 | 7.3 | 1,480 | 10.86 | 6.09 | 8.34 | 11.6/1.9/11.3 |
| 20 | AmSO4 | K2SO4 | 35.33 | 1.607 | 0.941 | 2.11 | 9.5 | | 8.38 | 4.59 | 4.81 | |
| Pin Mill 1 | Urea | K2SO4 | 48.23 | 1.574 | 0.926 | 2.72 | 3.2 | | 10.29 | 5.63 | 7.15 | | note: final K always lower than calculated

Nutrient Typical Values (except for entrainment velocity which was measured

| | | | | | | | | | | | | |
|---|---|---|---|---|---|---|---|---|---|---|---|---|
| Urea, prilled | | | 53.66 | 1.33 | 1.310 | 2.20 | 15.00 | 1,440 | 46 | 0 | 0 | |
| Urea, granulated | | | 53.66 | 1.33 | 1.265 | 5.50 | 1.75 | | 46 | 0 | 0 | |
| AmSO4 crystals | | | 60.84 | 1.77 | 1.615 | 4.40 | 0.60 | 1,320 | 21 | 0 | 0 | |
| K2SO4 crystals | | | | 2.54 | | 7.70 | 6.00 | 1,320 | 0 | 0 | 50 | |
| KCl crystals | | | 68.64 | 2.00 | 1.975 | 8.80 | 3.50 | 720 | 0 | 0 | 60 | |
| | kg/m3 | lb/ft3 | | | | | | | | | | |
| | 1100 | 68.64 | | | | | | | | | | |

Homogenous, Enriched Biosolids Product and Nutrient Additive Entrainment Study

The 100N fluid-bed was also used to determine process conditions associated with the present homogenous, enriched biosolids product and raw materials handling and conveying. The 100N fluid-bed was equipped with a straight sided 2 inch acrylic cylinder for the purpose of determining the entrainment velocity of granular materials. These tests addressed the concerns with respect to the limitations associated with the pneumatically conveying system that was in operation at Synagro, Inc. production facilities. As additional raw materials are incorporated into the final product to increase the chemical analysis, the density of the material will be affected. It was the purpose of these tests to determine what the entrainment velocities are for granular fertilizer 10-2-10 of the present invention and granular nutrient additives that are currently being considered. Listed below are those test results.

There was concern that the present biosolids material exiting the dryer may not convey as well as the current material due to increased particle density. In ACT's laboratory an entrainment test was conducted using a small fluid bed to measure the entrainment velocity of the present biosolids material. At 1500 Ft/min air velocity all the present biosolids product was entrained. The current air velocity at the exit duct in Pinellas was approximately 3,000 ft/min. Therefore no problem with material settling out during the test was anticipated.

TABLE 19

Entrainment Velocities

| Sample Identification | Entrainment Velocity (fpm) |
|---|---|
| Test 18 | 1480 |
| Prilled Urea | 1440 |
| Ammonium Sulfate Crystals | 1320 |
| Potassium Sulfate Crystals | 1320 |
| Potassium Chloride Crystals | 720 |

Example 3

Tests for Characterizing Premix

"Premix" is the biosolids discharged from the premixer and results from adding nutrient compounds to the sludge in the premixer.

Example 3A

Water and Temperature Required to Solubilize Nutrients in Premix Methodology

Tests were performed to determine the water and temperature required to solubilize potassium sulfate in various NPK formulation. See the below Table 20 and Table 21 for results.

Figure 4:
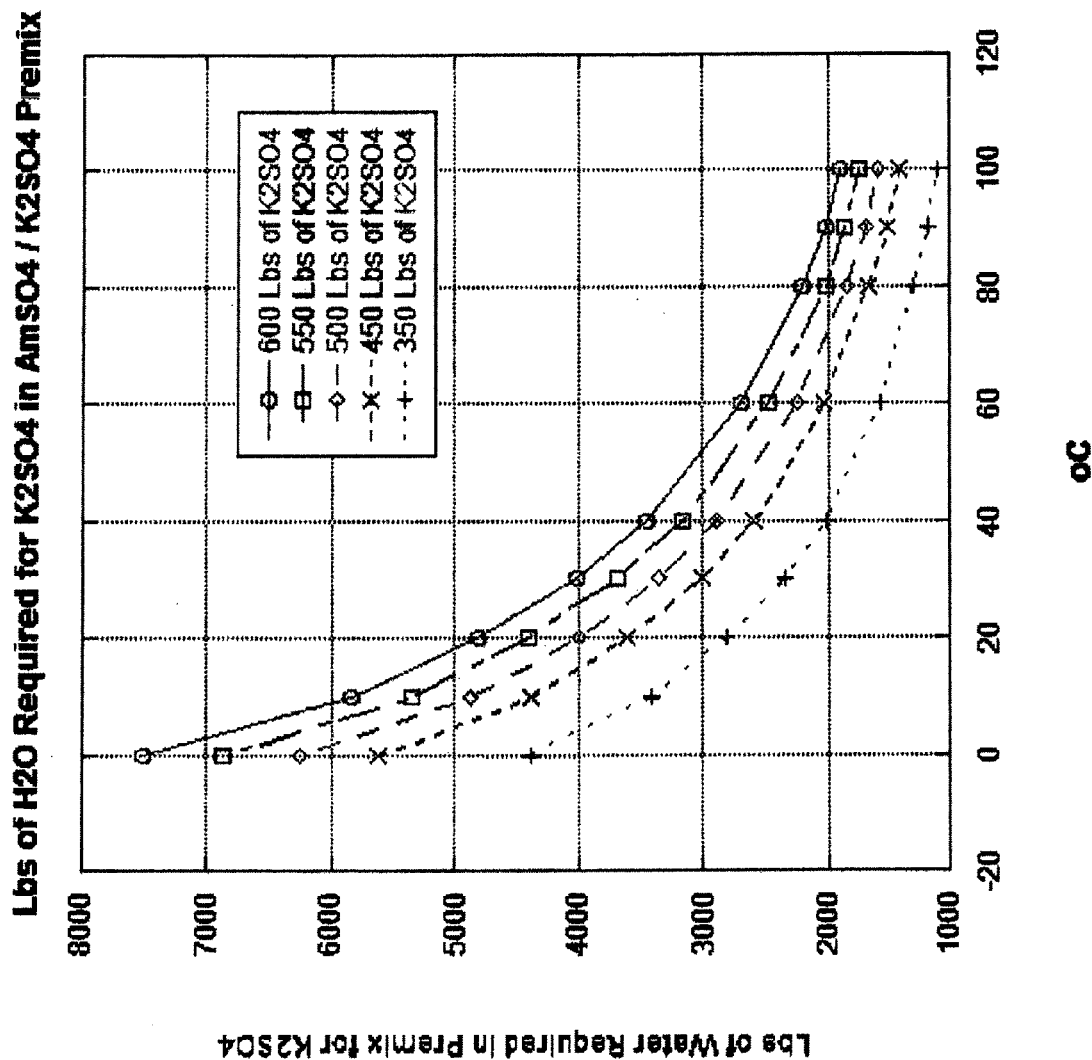
FIG. 4 shows the pounds of water required to solubilize potassium sulfate in ammonia sulfate and potassium sulfate premix, in Example 3A.

Further, see FIG. 4 for pounds of water required to solubilize potassium sulfate in ammonia sulfate and potassium sulfate premix.

TABLE 20

Water and Temperature Required to Solubilize Potassium Sulfate in Various NPK Formulations at Pinellas
Solubility: grams/100 grams of water

| °C. | Potassium Chloride KCl | Potassium Sulfate K2SO4 | Urea CO(NH2)2 | Ammonium Sulfate (NH4)2SO4 | Ammonium Dihydrogen Phosphate NH4H2PO4 ADP | Ammonium Phosphate (NH4)3PO4 | Diammonium Phosphate (NH4)2HPO4 DAP |
|---|---|---|---|---|---|---|---|
| 0 | 28.0 | 7.4 | | 70.6 | 22.7 | 9.4 | |
| 10 | 31.2 | 9.3 | | 73.0 | 39.5 | | 57.5 |
| 20 | 34.2 | 11.1 | 108 | 75.4 | 37.4 | 20.3 | |
| 30 | 37.2 | 13.0 | | 78.1 | 46.4 | | |
| 40 | 40.1 | 14.8 | 167 | 81.2 | 56.7 | | |
| 50 | 42.6 | | | 84.3 | 69.0 | 37.7 | |
| 60 | 45.8 | 18.2 | 251 | 87.4 | 82.5 | | |
| 70 | | | | | 98.6 | | |
| 80 | 51.3 | 21.4 | 400 | 94.1 | 118.3 | | |
| 90 | 53.9 | 22.9 | | | 142.8 | | |
| 100 | 56.3 | 24.1 | 733 | 103.0 | 173.2 Mono Ammonium Phosphate | | 106.7 |

TABLE 21

Temperature at Which the K2SO4 Loading is Saturated at the Water Level Available in the Mix

| | Product | K2SO4 | Available Water @ 20.5% | Min °C. | | Product | K2SO4 | Available Water @ 26% | Min °C. |
|---|---|---|---|---|---|---|---|---|---|
| 13-1-13 | 2504 | 750 | 4859 | 31.81 | 13-1-13 | 2504 | | | |
| 12-2-12 | 2504 | 700 | 5197 | 23.79 | 12-2-12 | 2504 | | | |
| 10-2-10 | 2504 | 550 | 6283 | 3.59 | 10-2-10 | 2504 | 550 | 4731 | 15.18 |
| 9-2-9 | | | | | 9-2-9 | 2504 | 500 | 5011 | 13.46 |
| 8-2-8 | 2504 | 420 | 7217 | | 8-2-8 | 2504 | 450 | 5292 | 10.96 |
| 6-2-6 | 2504 | 350 | 7922 | | 6-2-6 | | | | |

Tests were performed to determine the water and temperature required to solubilize potassium sulfate and ammonium sulfate in various NPK formulation. See the below Table 22 and Table 23 for results.

Figure 5:
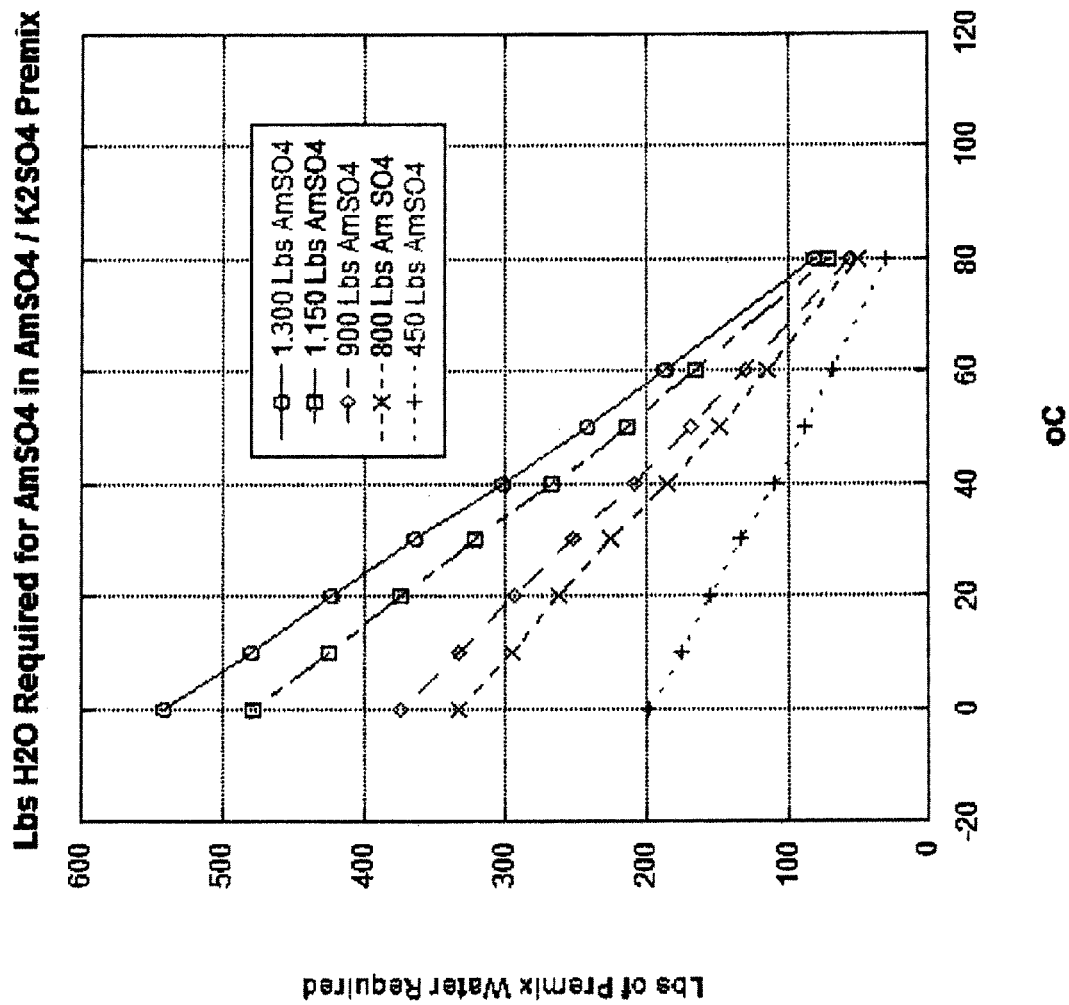
FIG. 5 shows the pounds of water required to solubilize ammonium sulfate in ammonia sulfate and potassium sulfate premix, in Example 3A.

Further, see FIG. 5 for pounds of water required to solubilize ammonium sulfate in ammonia sulfate and potassium sulfate premix.

Figure 6:
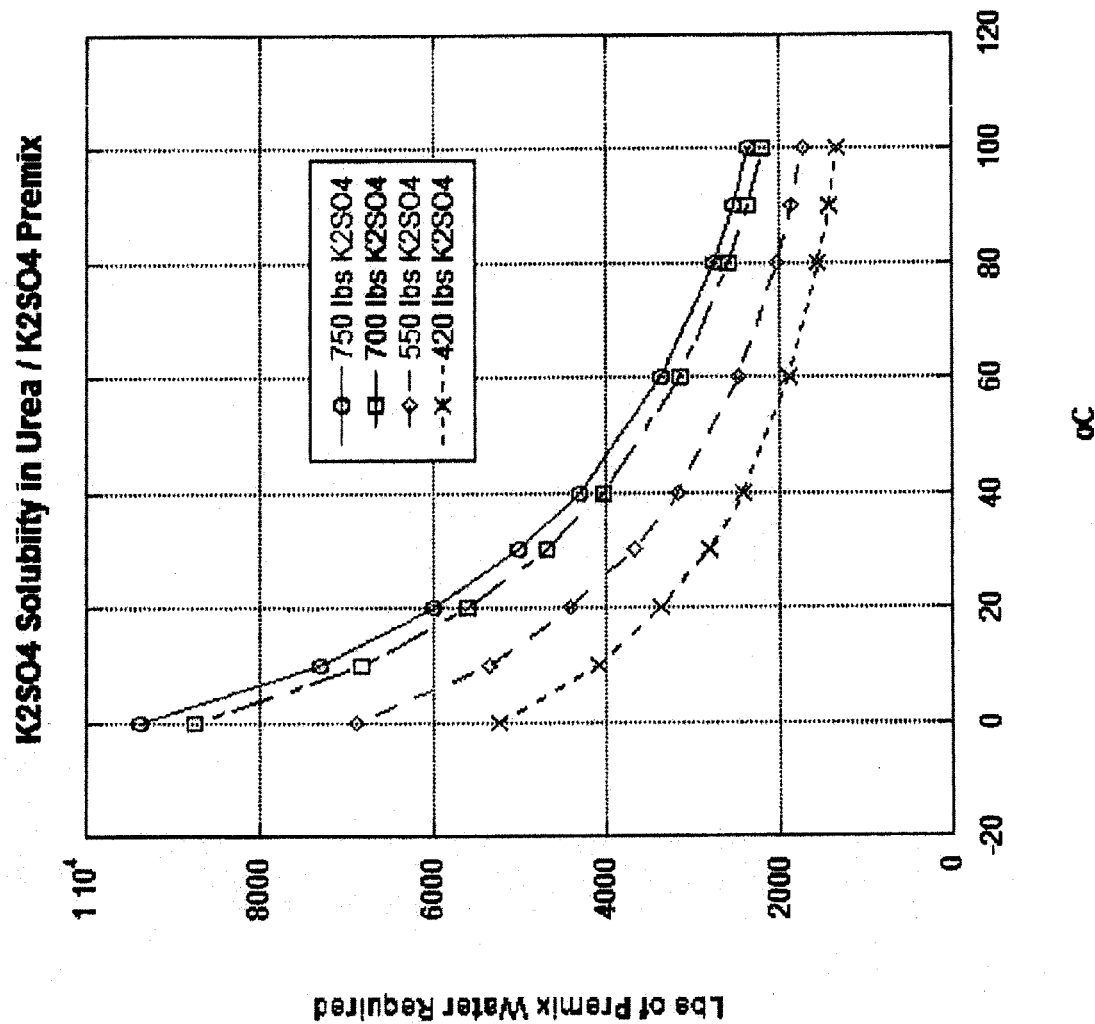
FIG. 6 shows the solubility of potassium sulfate in urea and potassium sulfate premix, in Example 3A.

Additionally, see FIG. 6 for potassium sulfate solubility in urea and potassium sulfate premix.

TABLE 22

Water and Temperature Required to Solubilize Potassium Sulfate and Ammonium Sulfate in Various NPK Formulations at Pinellas in Various NPK Formulations at Pinellas Solubility: grams/100 grams of water

| °C. | Potassium Chloride KCl | Potassium Sulfate K2SO4 | Urea CO(NH2)2 | Ammonium Sulfate (NH4)2SO4 | Ammonium Dihydrogen Phosphate NH4H2PO4 ADP | Ammonium Phosphate (NH4)3PO4 | Diammonium Phosphate (NH4)2HPO4 DAP |
|---|---|---|---|---|---|---|---|
| 0 | 28.0 | 7.4 |  | 70.6 | 22.7 | 9.4 |  |
| 10 | 31.2 | 9.3 |  | 73.0 | 39.5 |  | 57.5 |
| 20 | 34.2 | 11.1 | 108 | 75.4 | 37.4 | 20.3 |  |
| 30 | 37.2 | 13.0 |  | 78.1 | 46.4 |  |  |
| 40 | 40.1 | 14.8 | 167 | 81.2 | 56.7 |  |  |
| 50 | 42.6 |  |  | 84.3 | 69.0 | 37.7 |  |
| 60 | 45.8 | 18.2 | 251 | 87.4 | 82.5 |  |  |
| 70 |  |  |  |  | 98.6 |  |  |
| 80 | 51.3 | 21.4 | 400 | 94.1 | 118.3 |  |  |
| 90 | 53.9 | 22.9 |  |  | 142.8 |  |  |
| 100 | 56.3 | 24.1 | 733 | 103.0 | 173.2 |  | 106.7 |
|  |  |  |  |  | Mono Ammonium Phosphate |  |  |

TABLE 23

Temperature at Which the (NH4)2SO4 & K2SO4 Loading is Saturated at the Water Level Available in the Mix

| AmSO4•K2SO4 | Product | Cake | AmSO4 | K2SO4 | Available Water | Total Water AmSO4 & K2SO4 | Min °C. |
|---|---|---|---|---|---|---|---|
| Bioblend at 20.5% Cake Solids ||||||||
| 11-1-11 | 2504 | 2946 | 1300 | 600 | 2342 | 4617.8 | 77.78 |
| 10-1-10 | 2504 | 3922 | 1150 | 550 | 3118 | 4221.0 | 43.13 |
| 9-1-9 | 2504 | 5385 | 900 | 500 | 4281 | 3794.6 | 19.93 |
| 8-1-8 | 2504 | 6117 | 800 | 450 | 4863 | 3427.0 | 8.66 |
| 6-2-6 | 2504 | 8190 | 475 | 350 | 6511 | 2805.4 | −13.8 |
| Bioblend at 26.0% Cake Solids ||||||||
| 11-1-11 | 2504 |  |  |  |  |  |  |
| 10-1-10 | 2504 | 2900 | 1200 | 550 | 2146 | 4235.6 | 77.83 |
| 9-1-9 | 2504 | 4246 | 900 | 500 | 3142 | 3794.6 | 38.69 |
| 8-1-8 | 2504 | 4631 | 850 | 450 | 3427 | 3427.0 | 26.58 |
| 6-2-6 | 2504 | 6458 | 475 | 350 | 4779 | 2805.4 | −1.83 |

Example 3B

Test for Optimization Temperature of Premix

Tests were performed to determine the minimum premix temperatures for the present biosolids product of the present invention. See the below Table 24 for results.

TABLE 24

Minimum Bioblend Premix Temperatures with 20.5% Cake Solids

| Urea - K2SO4 | °C. | AmSO4—K2SO4 | °C. |
|---|---|---|---|
| 13-1-13 | 31.81 | 11-1-11 | 77.78 |
| 12-2-12 | 23.79 | 10-1-10 | 43.13 |
| 10-2-10 | 3.59 | 9-1-9 | 19.93 |
| 8-2-8 |  | 8-1-8 | 8.66 |
| 6-2-6 |  | 6-2-8 | -13.88 |

Figure 7:
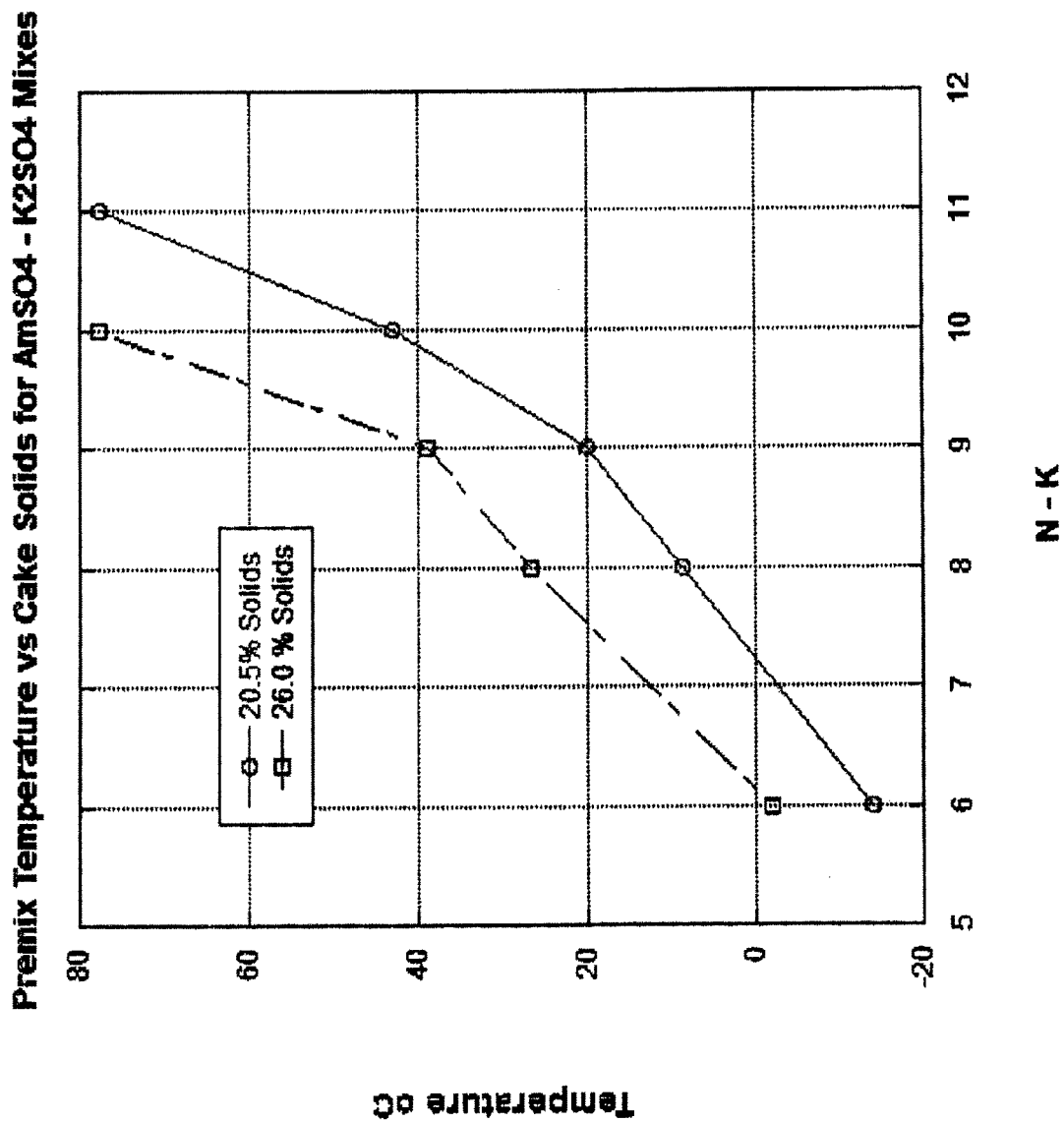
FIG. 7 shows the premix temperature for sludge cake solids in ammonia sulfate and potassium mixes, in Example 3B.

Note:
Premixes generally require higher temperature cake with higher cake solids if the goal is to produce high NPK products Further, see FIG. 7 for premix temperature for sludge cake solids in ammonia sulfate and potassium mixes.

Example 4

Bulk Storage Stability

Example 4A

Test for Sorption of Water by Product Granules

This the same testing that was done on Bioblend to check on its ability to sorb water. The New York Organic Fertilizer Company (NYOFCo) (Bronx) sludge is sourced from the same sewage treatment systems as Pinellas Co., FL. In the Bronx test, the sorption was done on pellets with and without pellet oil which is a mix of fatty acids (yellow grease) added to pellets at about 2 gallons per ton for dust control during loadout. The bare pellet took only 10.5 hours to take up the water from 5% to 95% humidity.

Sorption Test Results

Two samples of dried sludge pellets were received from NYOFCo for moisture sorption/desorption testing at 72° F. (22° C.). One sample of the dried sludge pellets was coated with oil.

Each moisture sorption isotherm was performed in 5% relative humidity increments, following an initial drying step (equilibration at near 0% relative humidity and the same temperature for a period of two hours). Following equilibration to the dry state, the relative humidity in the sample chamber was first increased in 5% relative humidity steps to 95% relative humidity, and then decreased in 5% increments back to near 0% relative humidity. The experiments were performed using an IGAsorp Moisture Sorption Analyzer, made by Hiden Analytical, Ltd.

Figure 8:
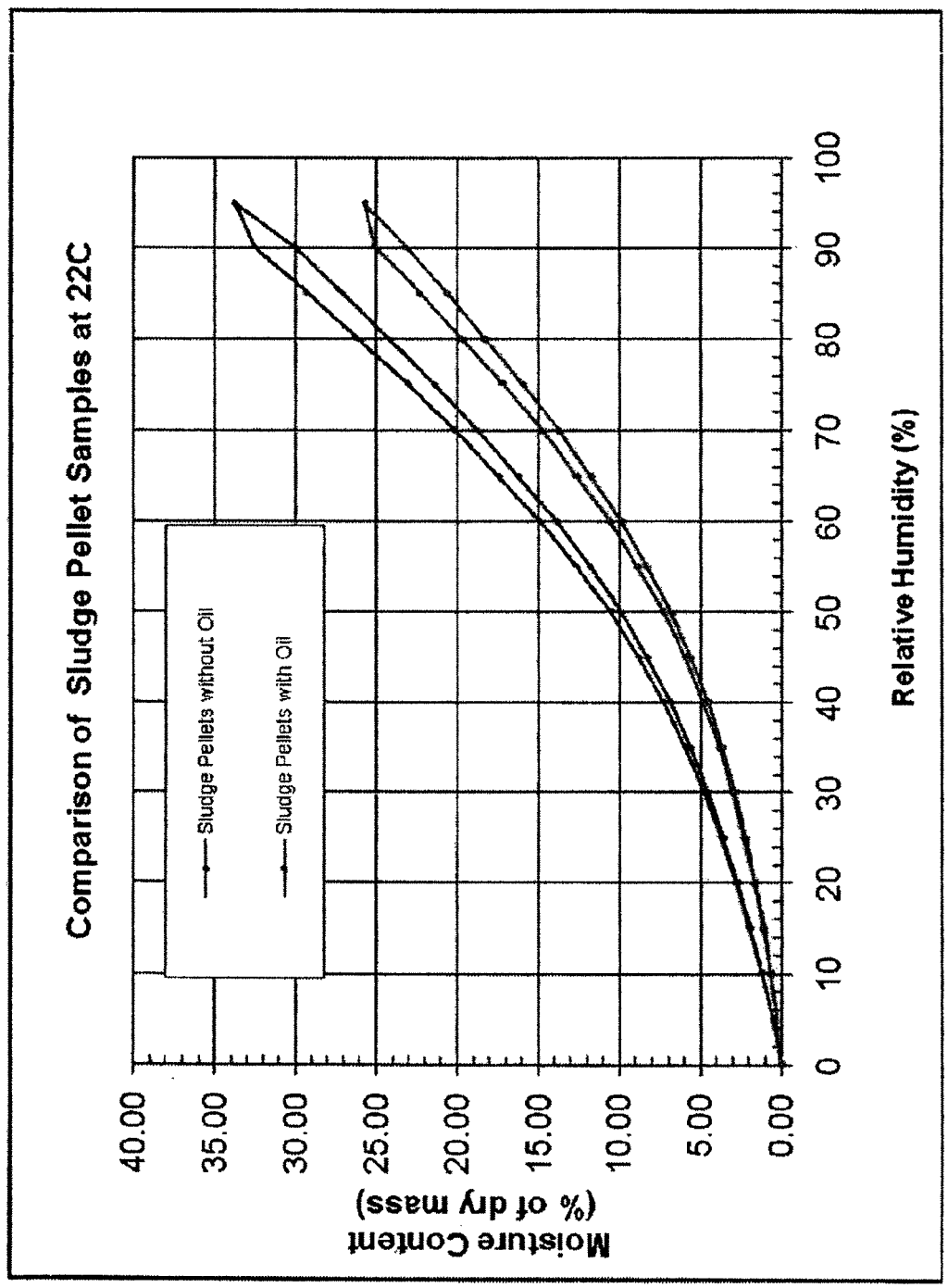
FIG. 8 shows the moisture content of sludge pellets at relative humidity from the moisture sorption/desorption test results of Example 4A.

The moisture sorption/desorption tests results on each sample are shown in FIG. 8. The results illustrate that the sludge pellets coated with oil do not pick up as much moisture from the humid air as the uncoated sludge pellets.

The data show that the moisture uptakes and losses for both pellet samples are exponential with relative humidity and have some hysteresis on the desorption side of the isotherm, most particularly at the upper relative humidity levels.

The sludge pellets without oil have the greater uptake at all relative humidity levels, with the max uptake of 33.75% at 95% relative humidity, versus 25.72% at 95% relative humidity for uncoated pellets.

Example 4B

Water Sorption and Heat Release Tests

Results for sample enriched biosolids product of the present invention (referred to here as "Bioblend") from the Pilot Plant employed in above Example 1.
Bioblend Pellets
Test Information: Bioblend

| CHEMICAL | WEIGHT (mg) | SOURCE/CTI REFERENCE |
|---|---|---|
| Bioblend | 550 | Synagro Northeast, Inc., Naugatuck, CT |
| DI-Water | 162 | Sigma-Aldrich Corporation, Saint Louis, MO |

The sample of Bioblend pellets was charged to the vessel and equilibrated at 25° C. The water was added in one shot and the system was stirred until no more heat was released.

The addition of water caused a small endothermic event at the beginning, followed by an exotherm event which released −1.19 Joules/gram. The initial endotherm was due to the difference of temperature between the sample and water.

Figure 9:
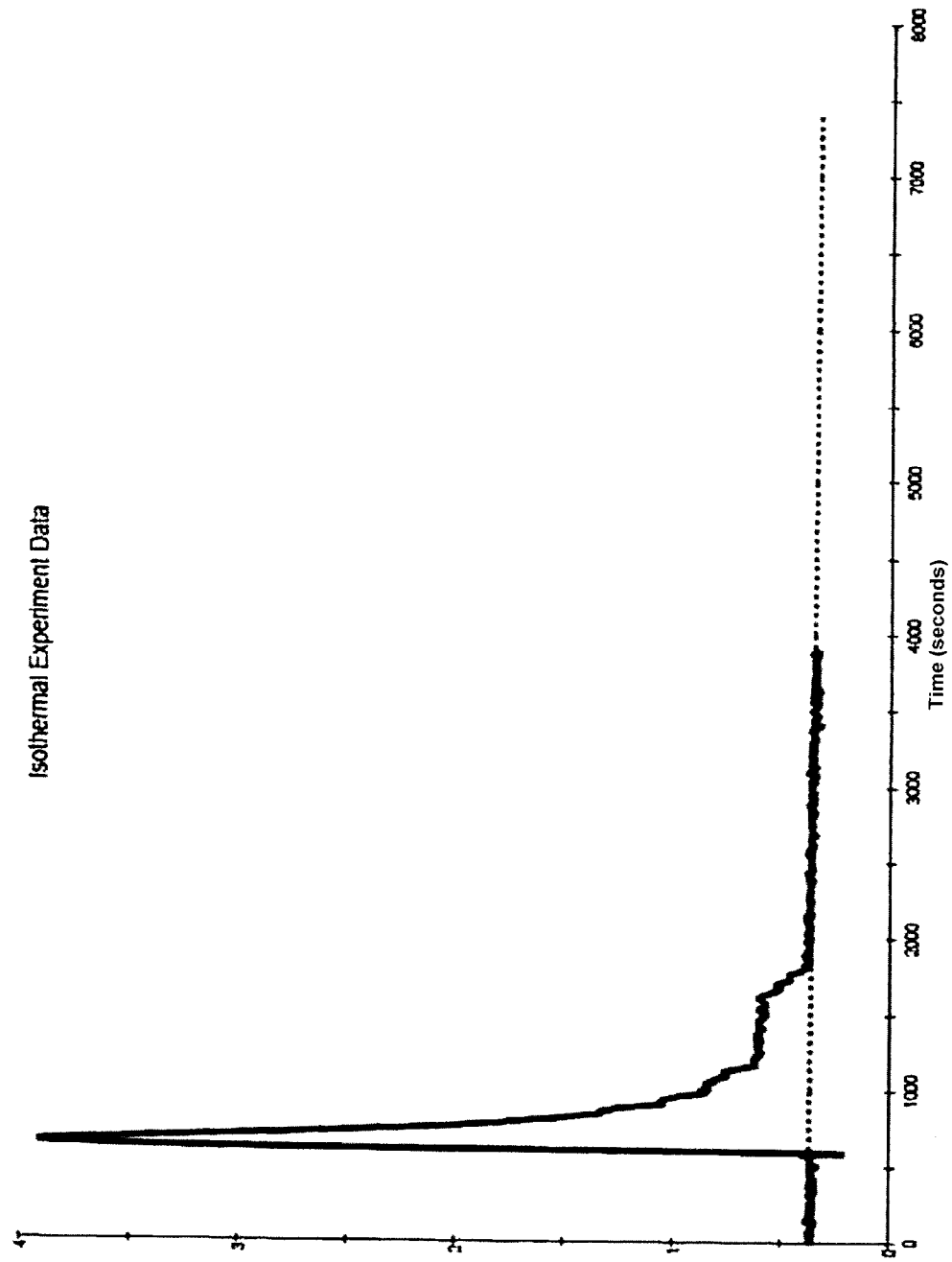
FIG. 9 shows the heat flow from a microcalorimeter for pellets of product of the invention, in Example 4B.

See FIG. 9 for heat flow in a calorimeter for Bioblend pellets. Baseline pellets (no nutrients added), referred to as "Base pellets."
Test Information: Base Pellets

| CHEMICAL | WEIGHT (mg) | SOURCE/CTI REFERENCE |
|---|---|---|
| FloridaBase | 510 | Synagro Northeast, Inc., Naugatuck, CT |
| DI-Water | 150 | Sigma-Aldrich Corporation, Saint Louis, MO |

The sample of Base pellets was charged to the vessel and equilibrated at 25° C. The water was added in one shot and the system was stirred until no more heat was released.

The addition of water caused a small endothermic event at beginning, followed by an exotherm which released −28.11 Joules/gram. The initial endotherm was due to the difference of temperature between the sample and water.

Figure 10:
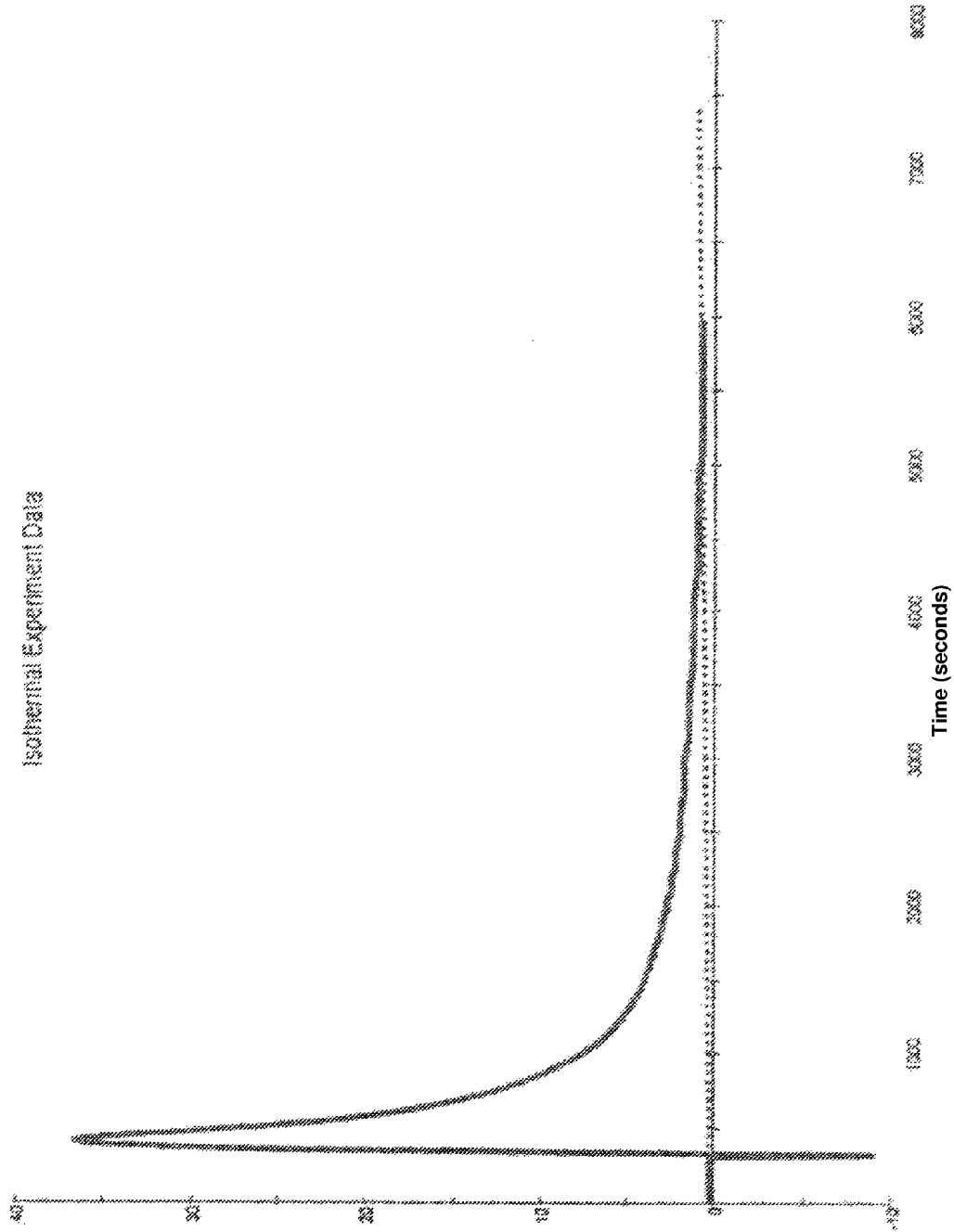
FIG. 10 shows the heat flow from a microcalorimeter for base pellets of sewage sludge, serving as a baseline for comparison, in Example 4B.

See FIG. 10 for heat flow in a calorimeter for Base pellets.

Example 4C

Atmospheric Water Sorption Test Results for Sample Pellets from Pinellas, Fla.

Moisture Sorption Test Results

The sample of nutrient enriched biosolids product of the present invention (Bioblend) pellets (containing urea and potassium chloride (potash)) labeled "Bioblend—Pinellas, Fla." were received from Synagro's Pinellas County, Florida pilot plant) for moisture sorption/desorption testing at 72° F. (22° C.).

Each moisture sorption isotherm was performed in 5% relative humidity increments, following an initial drying step (equilibration at near 0% relative humidity and the same temperature for a period of two hours). Following equilibration to the dry state, the relative humidity in the sample chamber was first increased in 5% relative humidity steps to 95% relative humidity, and then decreased in 5% increments back to near 0% relative humidity. The experiments were performed using an IGAsorp Moisture Sorption Analyzer made by Hiden Analytical, Ltd.

Figure 11:
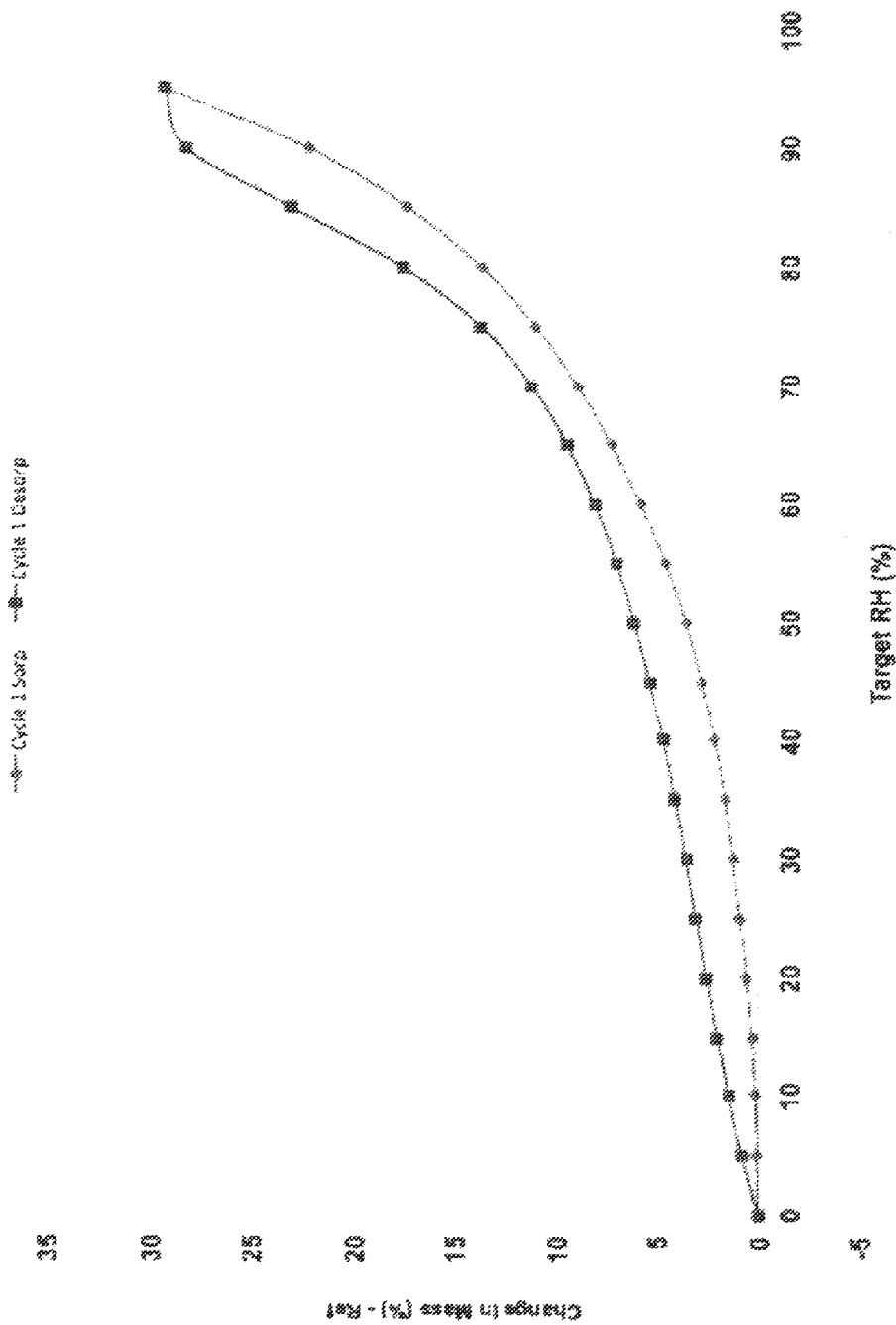
FIG. 11 shows the moisture sorption/desorption test results of Example 4C for the material, Bioblend (Pinellas, Fla.) at 220° C., MRef:BU.b821 mg.

The moisture sorption/desorption tests results are shown in FIG. 11 (moisture sorption/desorption isotherm). The data show that the moisture uptakes and losses for the sample are exponential with relative humidity and have some hysteresis on the desorption side of the isotherm.

Example 5

Odor Headspace Analysis

In producing the present biosolids product, the process of the present invention changed the odor character of the biosolids product and provided an improvement in the odor profile compared to the base pellets produced at the Pinellas pilot plant (described in Example 1). Comparative headspace test data is shown in Table 25. The headspace analysis was performed by warming the respective pellet causing volatiles to come off the pellet, which remained intact. The headspace is the volatiles that are effectively in equilibrium with the pellet. Analysis was performed by gas chromatography.

TABLE 25

Headspace Analysis of Present Biosolids Product and Pinellas Base Pellets Headspace Analysis at 120° F.

| Base | Mass % | Present Biosolids Product |
| --- | --- | --- |
| 25.79 | acid | 5.25 |
| 2.45 | alcohol | 8.11 |
| 14.18 | aldehyde | 8.77 |
| 13.33 | alkane | 7.53 |
| 2.33 | alkene | nd |
| 2.31 | alkyne | nd |
| nd | aromatic | 0.84 |
| 7.20 | gas | 4.24 |
| 18.24 | ketone | 30.57 |
| 4.62 | organic | 1.87 |
| nd | phenol | 0.62 |
| 9.57 | siloxane | 32.27 |
| nd | sulfide | nd |

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

The invention claimed is:

1. A process for producing a nutrient enriched biosolids fertilizer comprising the following steps:
   A) premixing wet sewage sludge cake with liquid or solid plant nutrients selected from the group consisting of nitrogen compounds, phosphorus compounds and potassium compounds, in a first mixer to form a homogeneous mixture;
   B) mixing the homogeneous mixture from the first mixer in a second mixer together with recycled dried granules or pellets of biosolids fertilizer product of step E to form a dryer homogeneous mixture;
   C) granulating or pelletizing the dryer homogeneous mixture to result in granules or pellets;
   D) drying the granules or pellets of homogeneous mixture to result in dried granules or pellets of the biosolids fertilizer product; and
   E) recycling a portion of dried granules or pellets of homogeneous mixture to the second mixer.

2. The process of claim 1 further including the heating of the wet sludge cake to a temperature of 65 to 180° F. prior to mixing with liquid or solid plant nutrients.

3. The process of claim 1 wherein the first mixer is a pug mill or plow mixer.

4. The process of claim 1 wherein the step of drying the granules or pellets of homogeneous mixture employs a dryer which is a rotary drum drying system or a heated screw drying system.

5. The process of claim 1 wherein the solids content of the homogeneous mixture in the first mixer is 17 to 35 percent solids.

6. The process of claim 1 wherein the moisture content of the first mixer is maintained sufficient to solubilize the nutrient compounds.

7. The process of claim 1 wherein, of the liquid or solid plant nutrients, the nitrogen compound is added to the mixer first.

8. The process of claim 1 wherein the nitrogen compound is urea, the phosphorus compound is diammonium phosphate and the potassium compound is potassium sulfate, resulting in the granules or pellets of the biosolids fertilizer product having NPK of 13-6-13.

9. The process of claim 1 wherein the nitrogen compound is ammonium sulfate, the phosphorus compound is diammonium phosphate and the potassium compound is potassium sulfate, resulting in the granules or pellets of biosolids fertilizer product having NPK of 9-6-9.

* * * * *